(12) United States Patent
Aceto et al.

(10) Patent No.: US 11,802,433 B2
(45) Date of Patent: Oct. 31, 2023

(54) MOTORIZED ACTUATOR AND MOVABLE BARRIER PROVIDED WITH SAID ACTUATOR

(71) Applicant: FAAC S.P.A., Zola Predosa (IT)

(72) Inventors: Danilo Aceto, Zola Predosa (IT); Samuele Magnoni, Bologna (IT)

(73) Assignee: FAAC S.P.A., Zola Predosa (IT)

( * ) Notice: Subject to any disclaimer, the term of this patent is extended or adjusted under 35 U.S.C. 154(b) by 279 days.

(21) Appl. No.: 16/870,095

(22) Filed: May 8, 2020

(65) Prior Publication Data

US 2020/0355007 A1 Nov. 12, 2020

(30) Foreign Application Priority Data

May 10, 2019 (IT) .......................... 102019000006728

(51) Int. Cl.
*E05F 15/63* (2015.01)
*E05F 15/611* (2015.01)
(Continued)

(52) U.S. Cl.
CPC .......... *E05F 15/611* (2015.01); *E05F 15/632* (2015.01); *F16H 19/001* (2013.01);
(Continued)

(58) Field of Classification Search
CPC ....... E05F 15/63; E05F 15/649; E05F 15/611; E05F 2015/631; E05F 1/10; E05F 1/1041;
(Continued)

(56) References Cited

U.S. PATENT DOCUMENTS 4,685,348 A * 8/1987 Takami ................... F16H 35/02
74/393
4,744,125 A 5/1988 Scheck et al.
(Continued)

FOREIGN PATENT DOCUMENTS

EP 0207251 A2 1/1987
EP 2933414 A1 10/2015
(Continued)

OTHER PUBLICATIONS

Search Report and Written Opinion for Italian Application No. 10201900006728 dated Jan. 14, 2020.

*Primary Examiner* — Jerry E Redman
(74) *Attorney, Agent, or Firm* — Pearne & Gordon LLP

(57) ABSTRACT

The motorized drive according to the invention application is configured to open and/or close a wing of a barrier such as a door, main door, gate or swing shutter, a wall or sliding partition or other sliding wing. The motorized drive comprises includes a motor and a first reduction unit through which the motor can open or close the wing. The reduction unit comprises includes a first and a second toothed profile engaging together, thus realizing a gear with a variable transmission ratio depending on the angular and/or linear position of at least one of the two toothed profiles. At least one of the first and of the second toothed profile forms at least one toothed section having a pitch profile which is substantially non-circular or not formed by a simple arc of a circle or a straight line.

16 Claims, 20 Drawing Sheets

(51) Int. Cl.
*E05F 15/632* (2015.01)
*F16H 19/00* (2006.01)
*F16H 35/02* (2006.01)

(52) U.S. Cl.
CPC .............. *F16H 35/02* (2013.01); *E05F 15/63* (2015.01); *E05F 2015/631* (2015.01); *E05Y 2900/132* (2013.01); *E05Y 2900/40* (2013.01); *F16H 2019/008* (2013.01)

(58) Field of Classification Search
CPC ............. E05F 1/1246; E05Y 2201/722; E05Y 2900/132
USPC .................. 49/339, 340, 341, 342, 344, 346
See application file for complete search history.

(56) References Cited

U.S. PATENT DOCUMENTS

| | | | | |
|---|---|---|---|---|
| 7,373,756 | B2* | 5/2008 | Okulov | E05F 15/41 |
| | | | | 49/346 |
| 11,047,591 | B2* | 6/2021 | Konrad | F16H 33/02 |
| 11,098,517 | B2* | 8/2021 | Yulkowski | E05F 15/603 |

FOREIGN PATENT DOCUMENTS

| | | | | |
|---|---|---|---|---|
| EP | 2933415 A1 * | 10/2015 | | E05F 15/63 |
| FR | 1510056 A | 1/1968 | | |
| WO | 2012010111 A1 | 1/2012 | | |

* cited by examiner

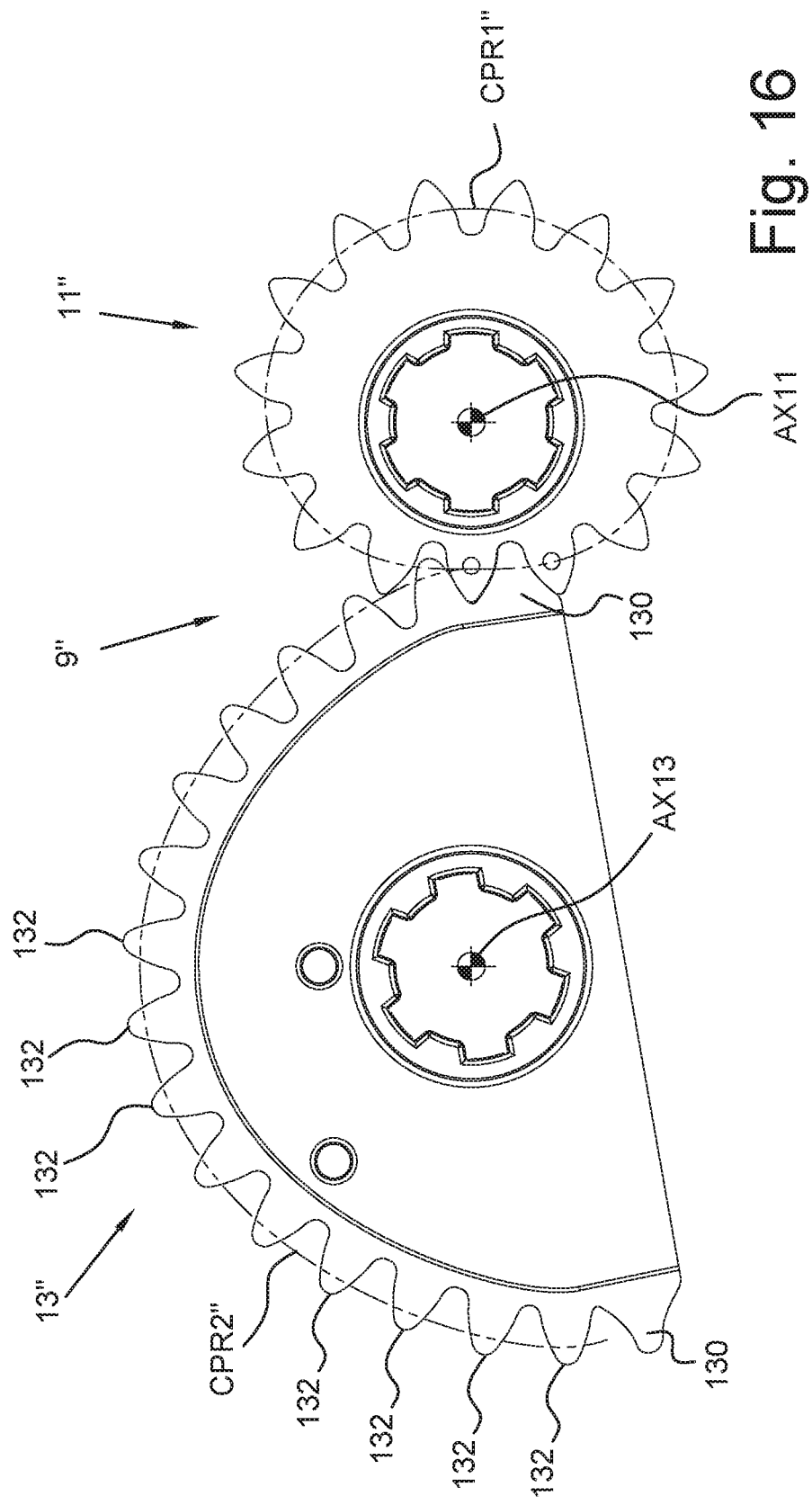

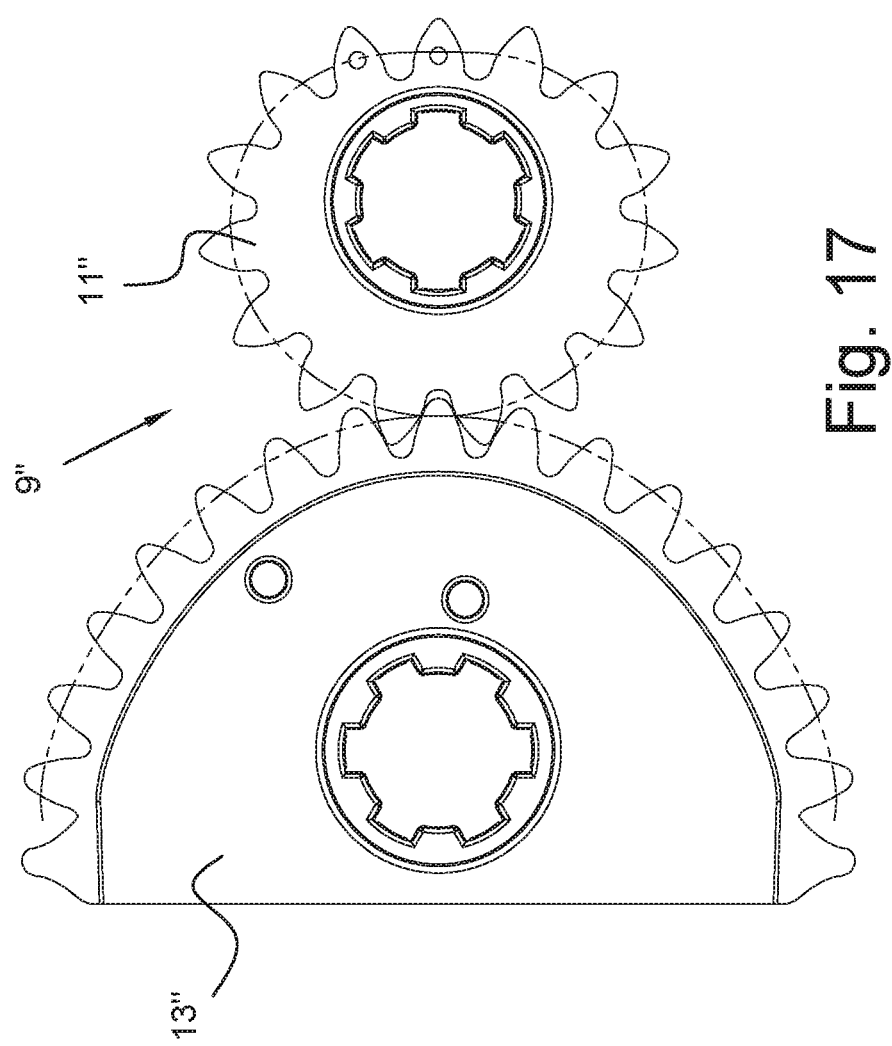

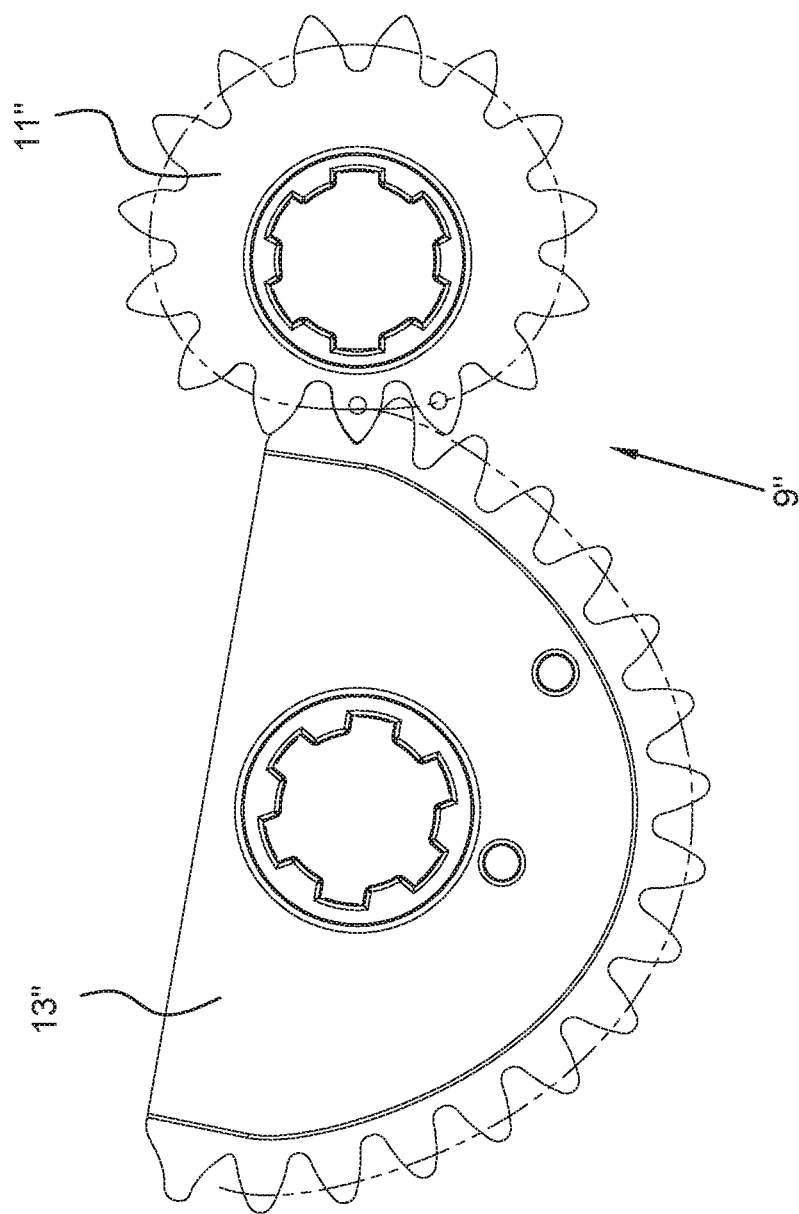

US 11,802,433 B2

MOTORIZED ACTUATOR AND MOVABLE BARRIER PROVIDED WITH SAID ACTUATOR

The present application claims the priority of the Italian patent application No. IT102019000006728, the content of which is incorporated in the present application by reference.

FIELD OF THE INVENTION

The present invention relates to a motorized drive for movable barriers such as doors, main doors, gates, swing shutters, sliding walls or partitions, and a movable barrier comprising said motorized drive.

BACKGROUND ART

The wings of the common doors and main doors generally open by rotating about 90° or slightly more, requiring a variable torque from the possible actuator that operates them.

Generally said actuator comprises a rotary electric motor.

In the initial and final phases of the opening or closing movement, i.e. acceleration and deceleration, the wing requires relatively high torques and low rotation speeds from the motor of the actuator.

On the other hand, in the intermediate phase of the movement the torque that the motor must deliver is almost zero, only having to overcome the frictions present in the rotating pairs of the wings, while the rotation speed is high.

Currently said composite actuations comprising accelerations, decelerations and zero acceleration phases are carried out exclusively by piloting the electric motor of the actuator, in order to obtain the desired speed trend of the wing despite the different torque requirements, or with kinematic systems downstream of the electric motor.

The authors of the present invention have found that it would be desirable to make the resistant torque which the motor must overcome and the speed which it must reach at the various positions of the wing or in any case at the various instants of the drives more uniform: this would allow at least to adopt motors with lower rated power as well as kinematic systems with lower gear ratios downstream of the electric motor, all with the same weight and inertia of the wing to be operated, and of the frictions to be overcome.

An object of the present invention is therefore to obviate the above mentioned drawbacks and in particular to provide a drive to open and/or close for example a wing of a door, gate, main door or swing shutter or still wall or sliding partition, wherein the resistant torque applied by the wing to the motor of the drive during the closing and/or opening movements is more uniform than the one applied by existing drives.

SUMMARY OF THE INVENTION

Said purpose is achieved, according to a first aspect of the present invention, with a motorized drive having a motor and a reduction unit, the reduction unit comprising a first and second toothed profile that engage one another, forming a gear with a variable transmission ratio. At least one of the first and second toothed profiles form at least one tooth section having a substantially non-circular pitch profile.

In a second aspect of the invention, this object is achieved with a movable barrier having a wing of at least one of a door, gate, or sliding partition, and a motorized drive configured to open and close said wing.

The dependent claims are directed to further features of the invention.

The advantages attainable with the present invention shall become more readily apparent, to the person skilled in the art, by the following detailed description of a particular, non-limiting embodiment, shown with reference to the following schematic figures.

LIST OF FIGURES

Figure 1:
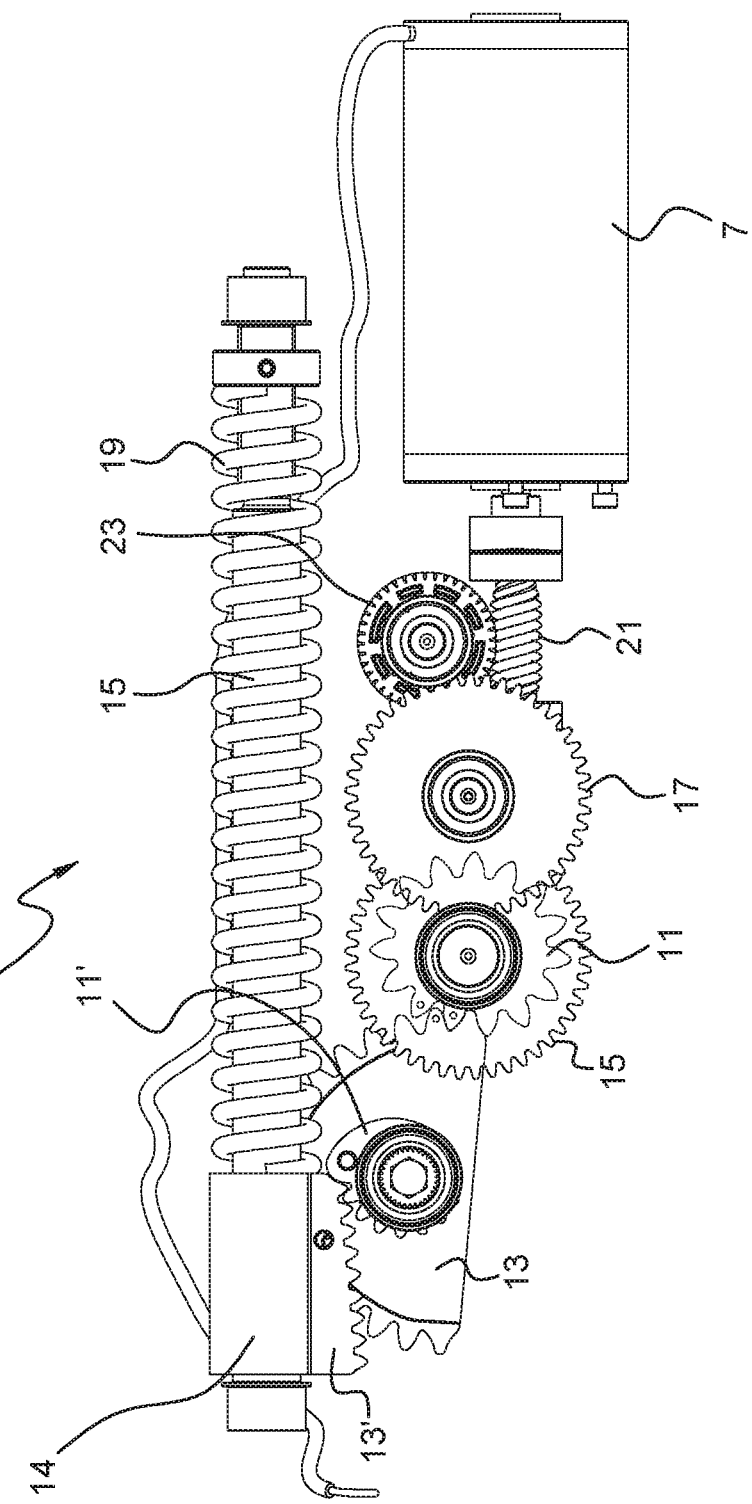
FIG. 1 shows a side view of a motorized drive according to a first particular embodiment of the invention.
Figure 4:
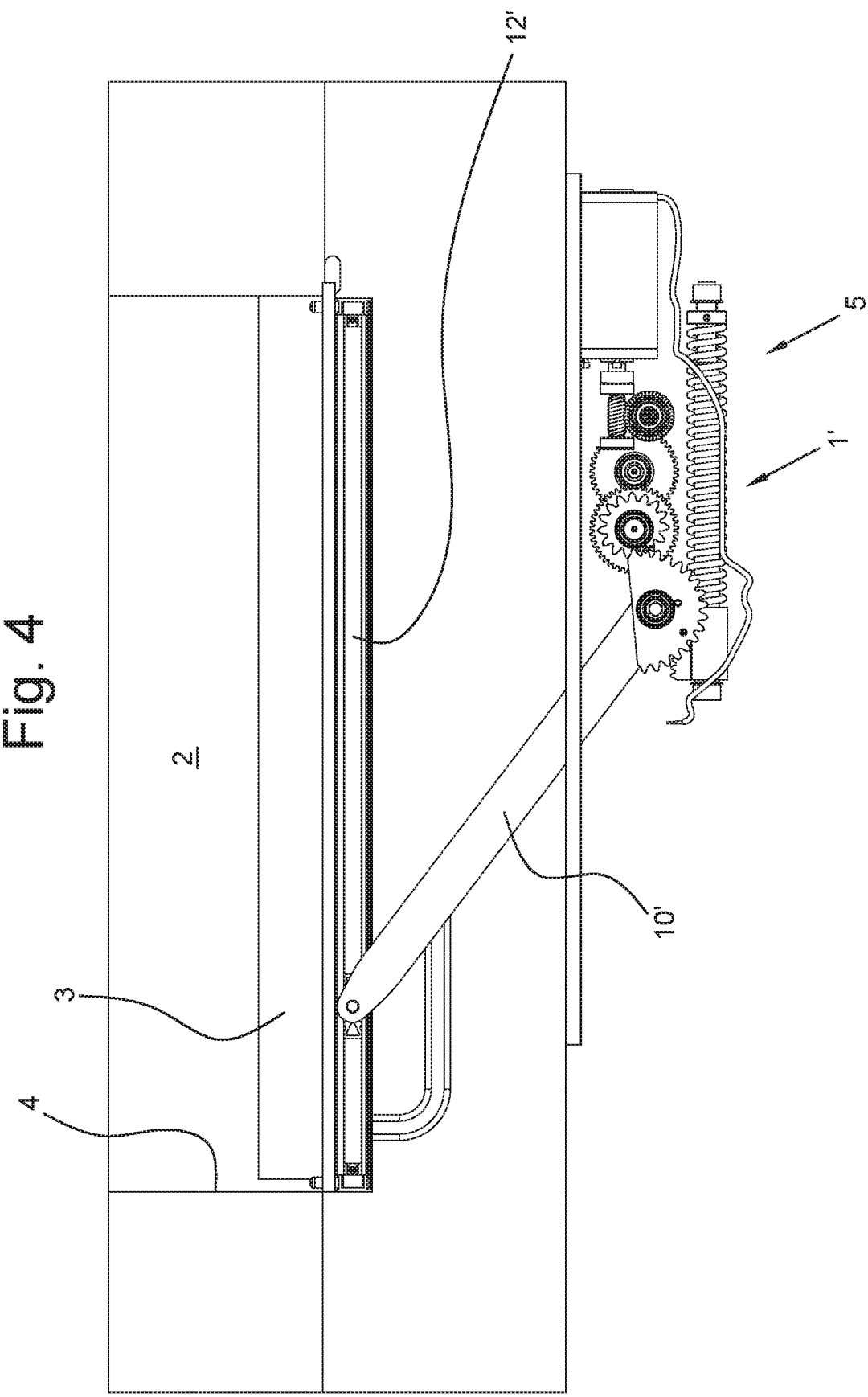
FIG. 4 shows a first top view of a door connected by a sliding arm to the motorized drive of FIG. 1 according to a second particular embodiment of the invention, in which the door is closed.
Figure 5:
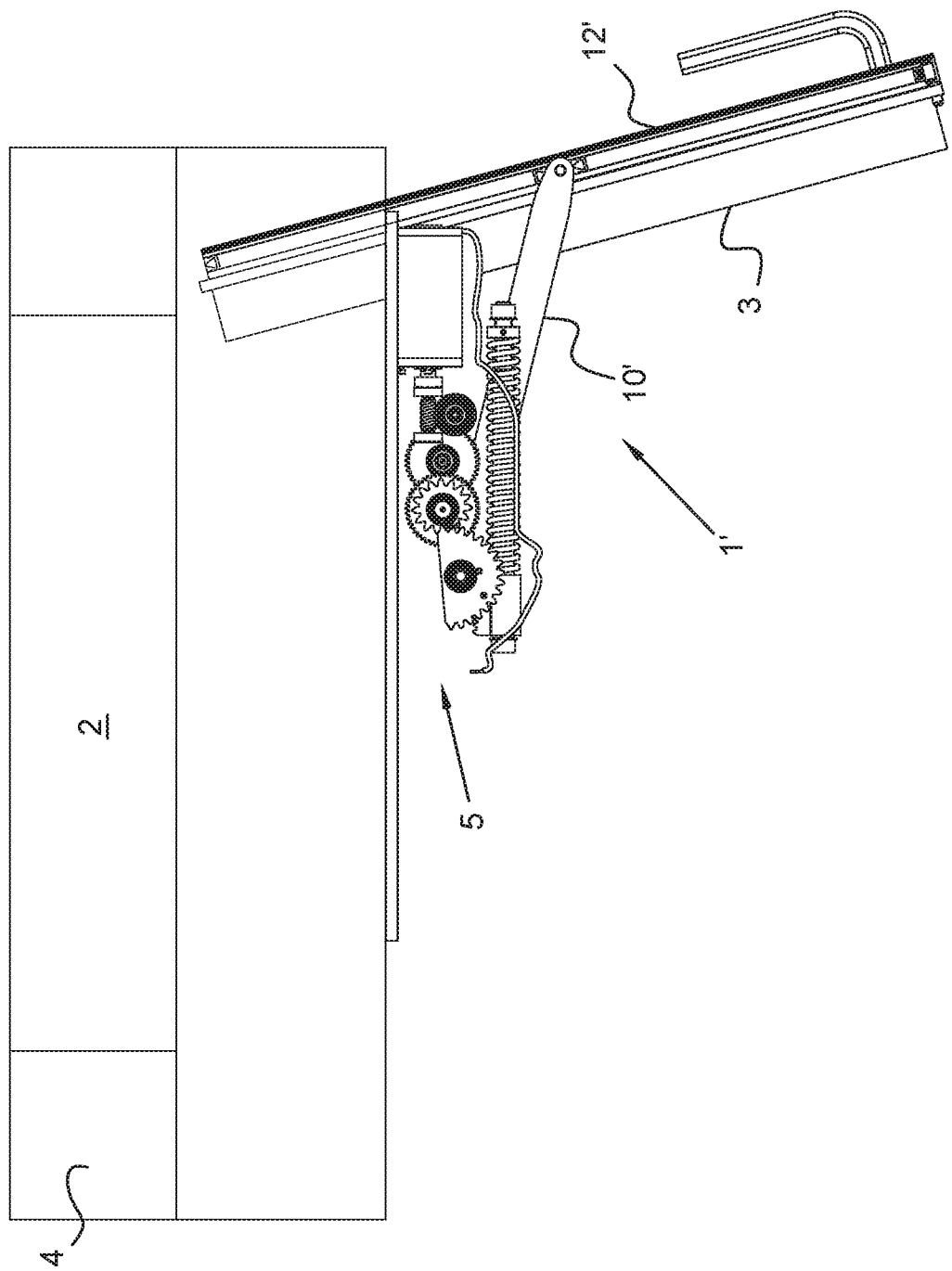
Figure 6:
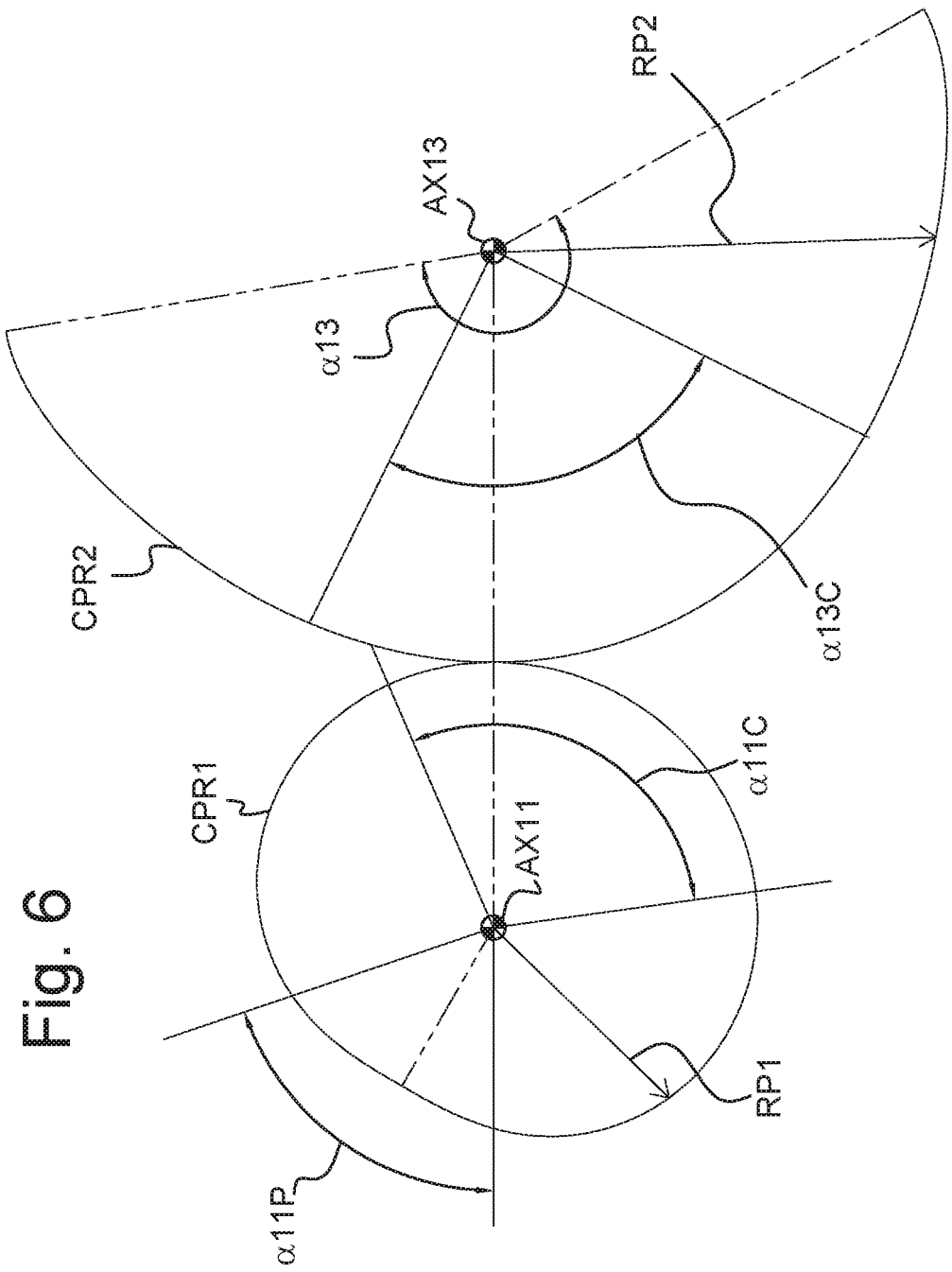
Figure 7:
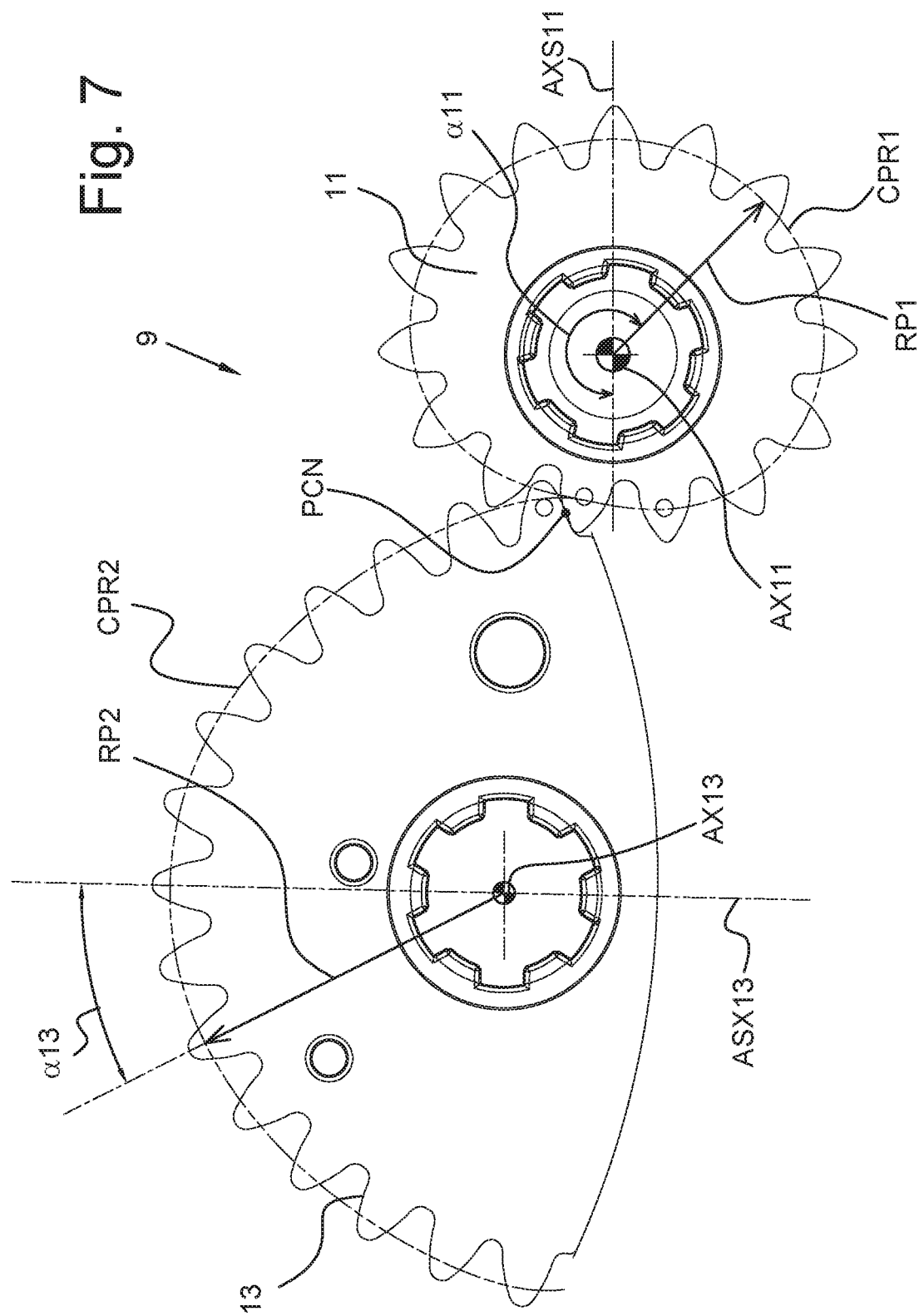
Figure 8:
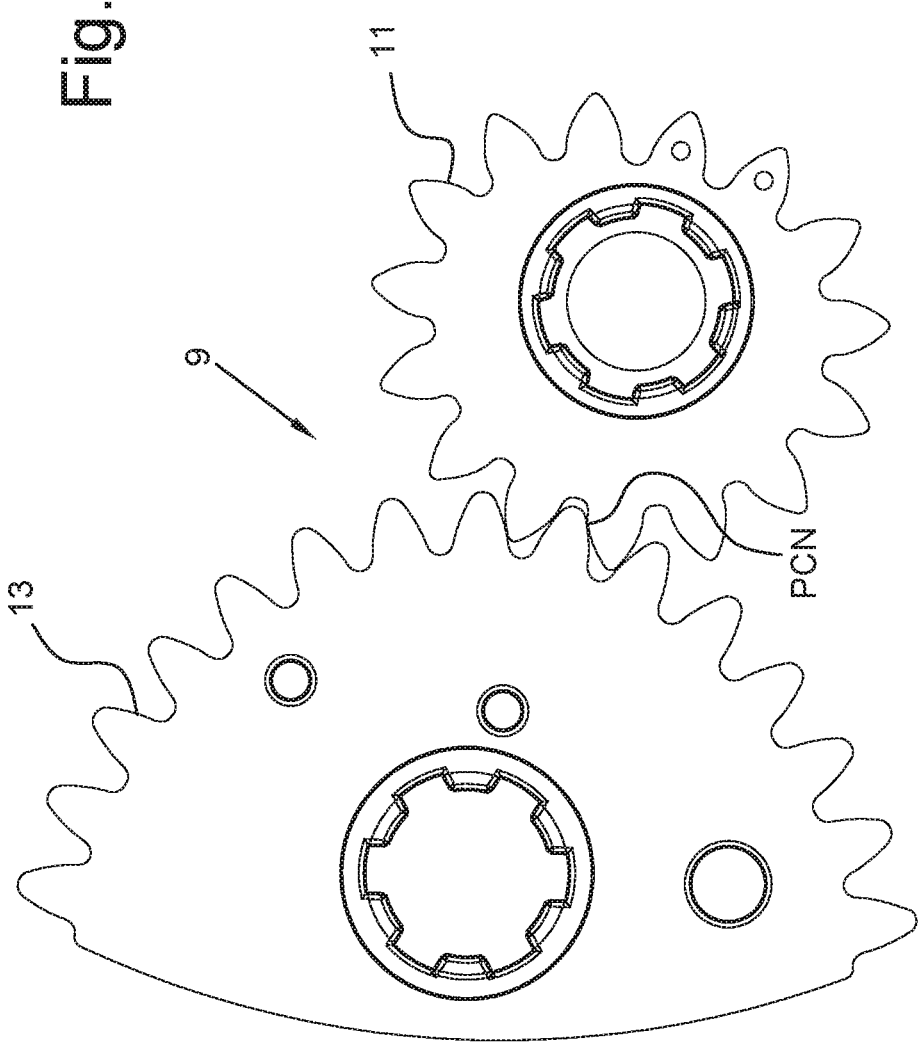
Figure 9:
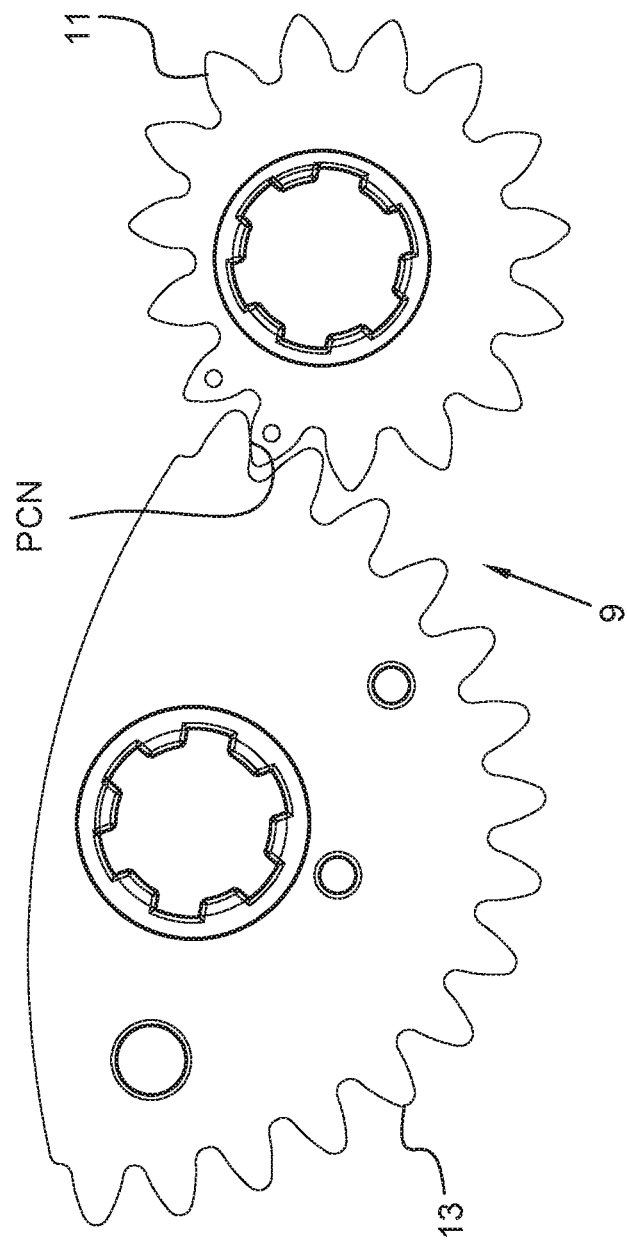
Figure 10:
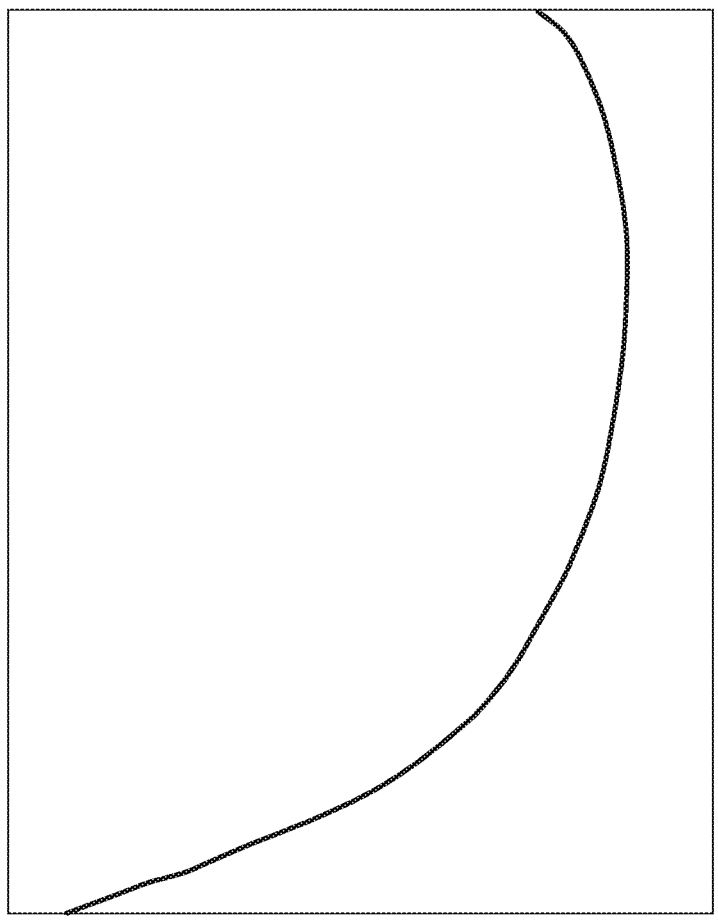
Figure 11:
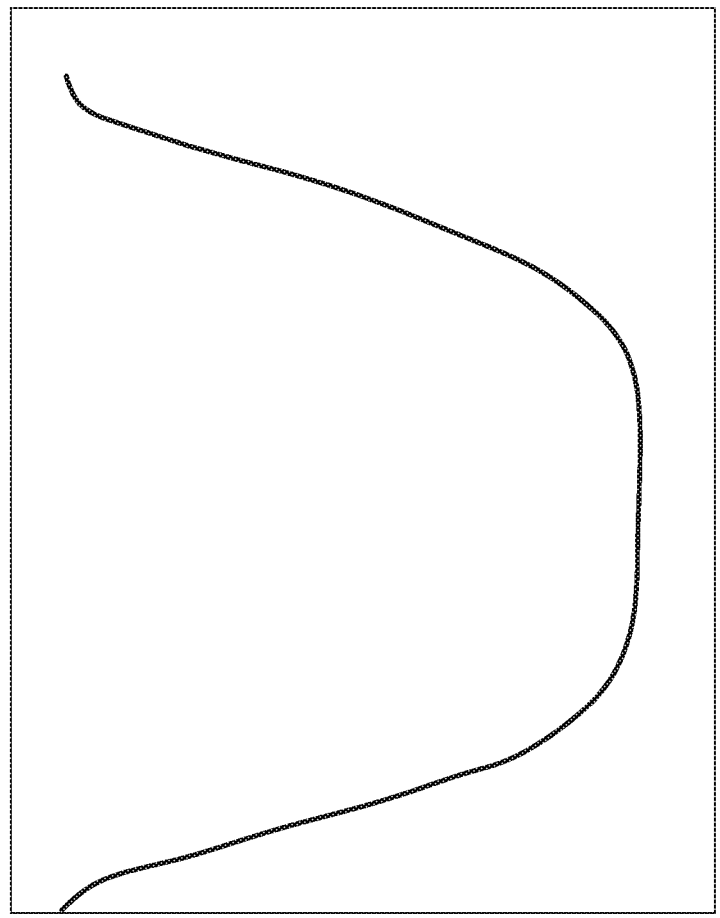
Figure 12:
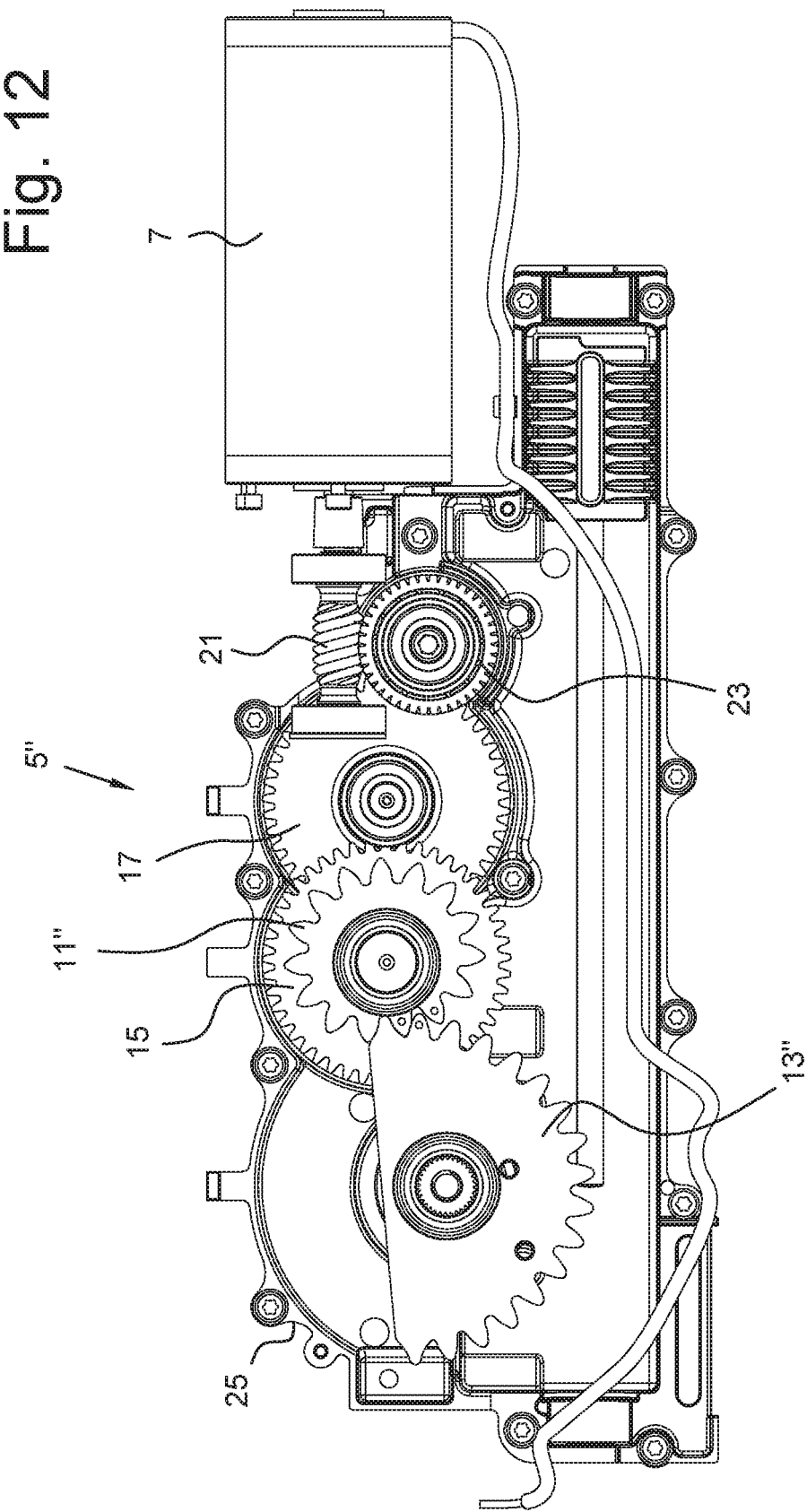
Figure 13:
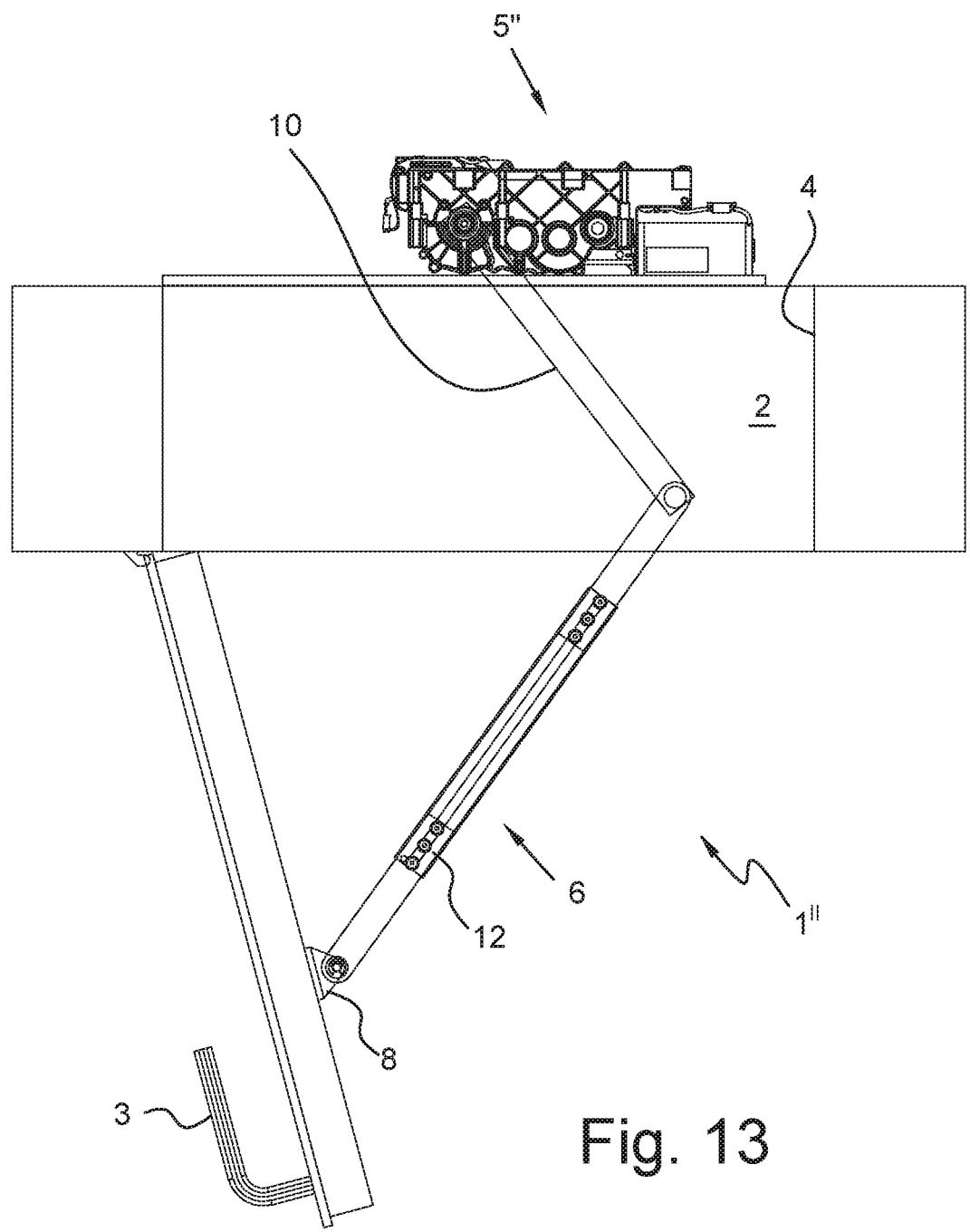
Figure 14:
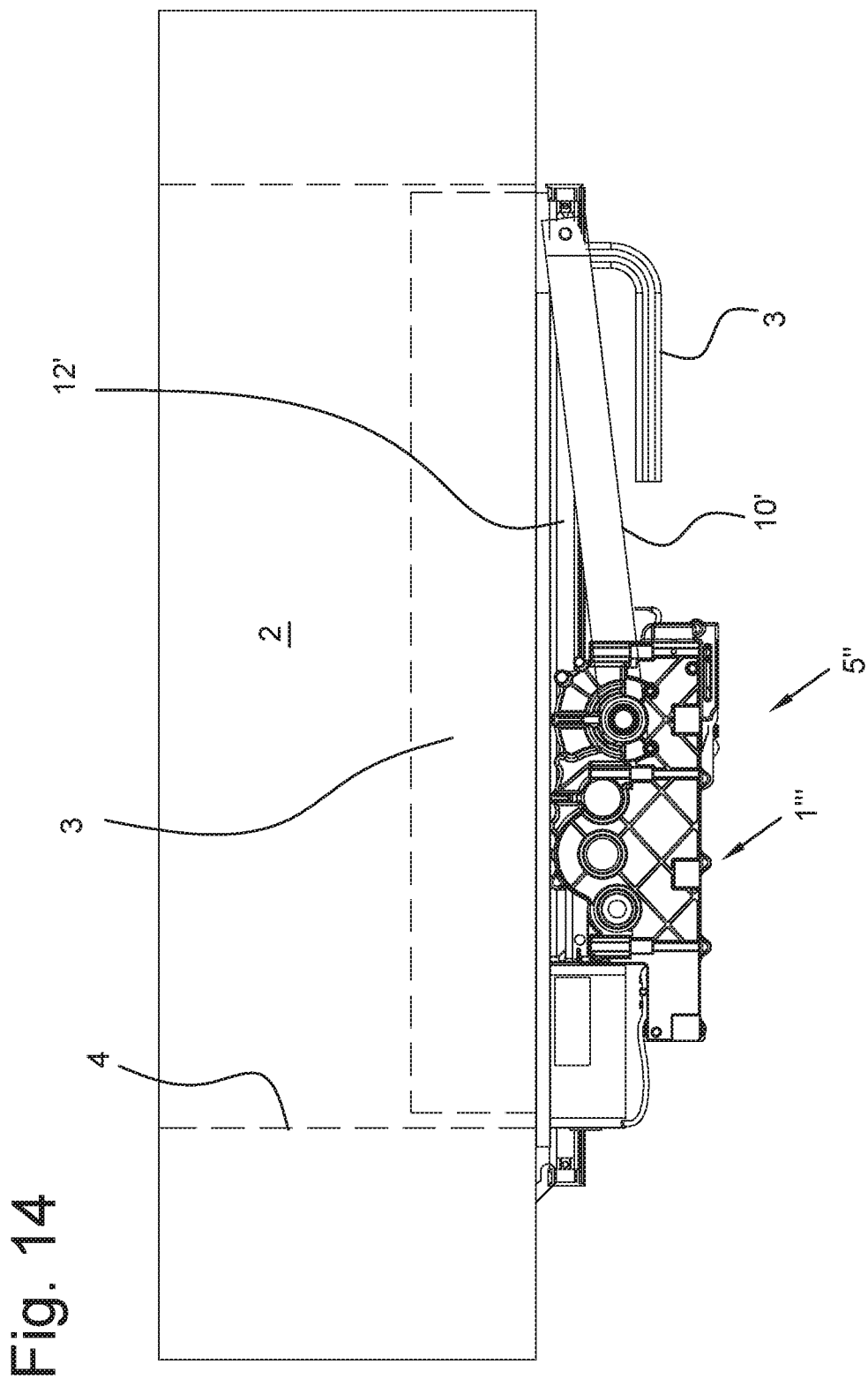
Figure 15:
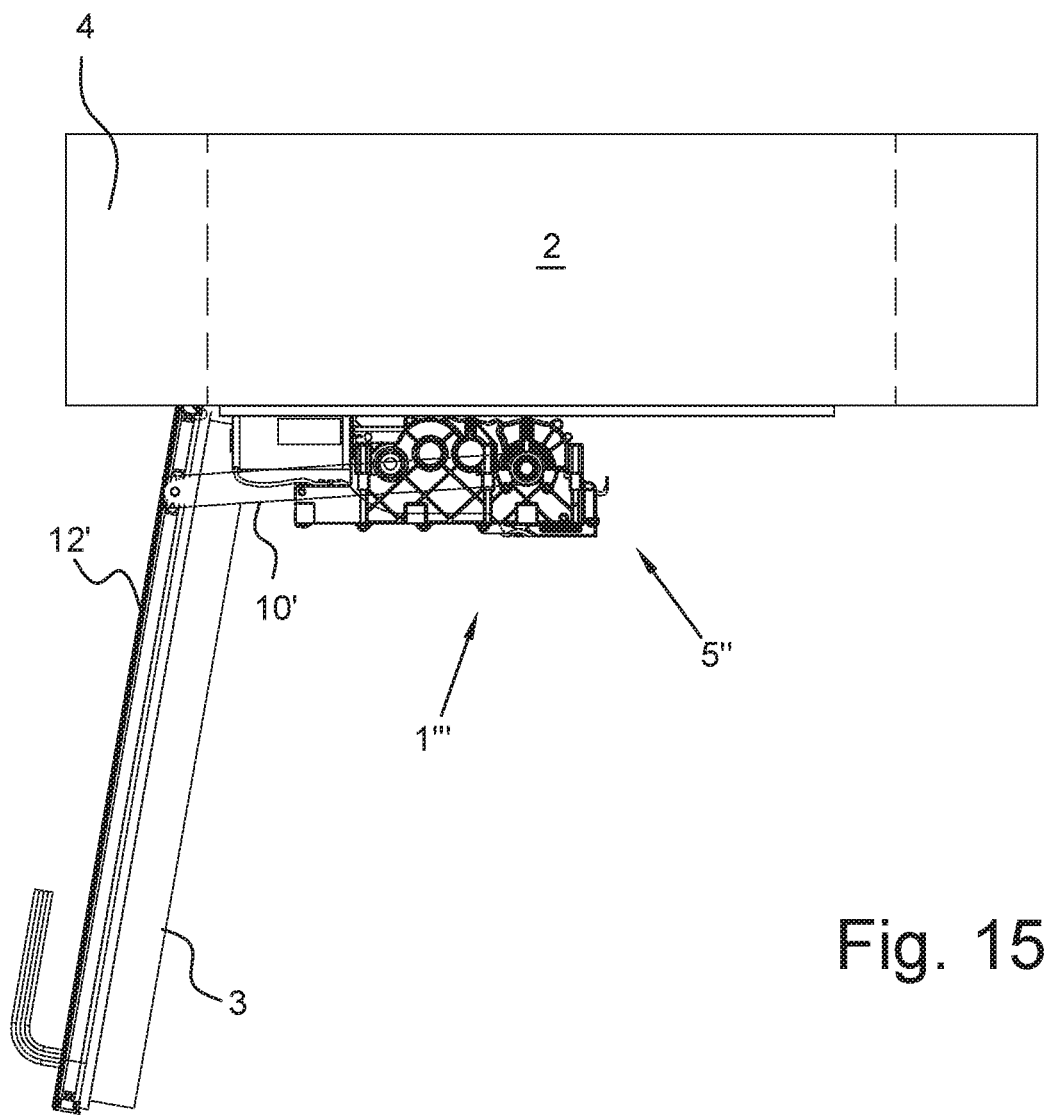
Figure 16B:
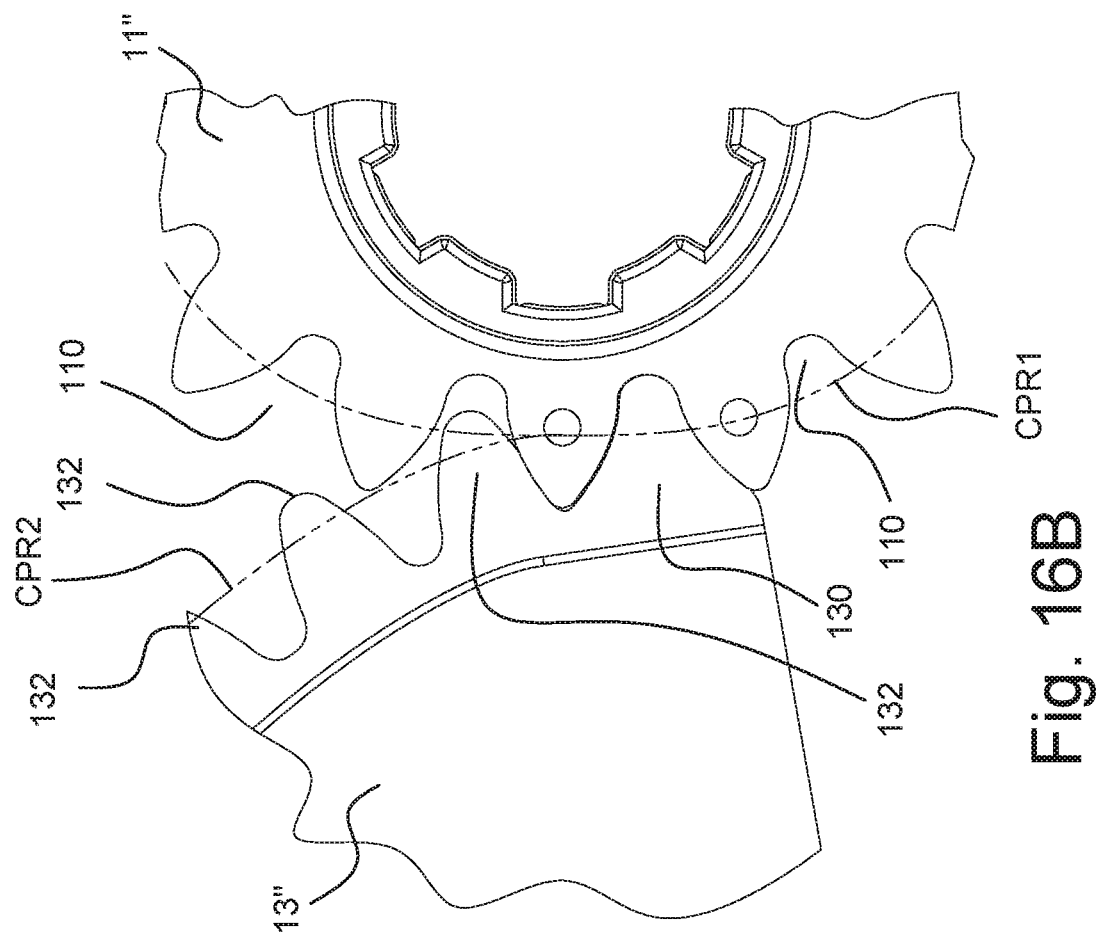
Figure 16A:
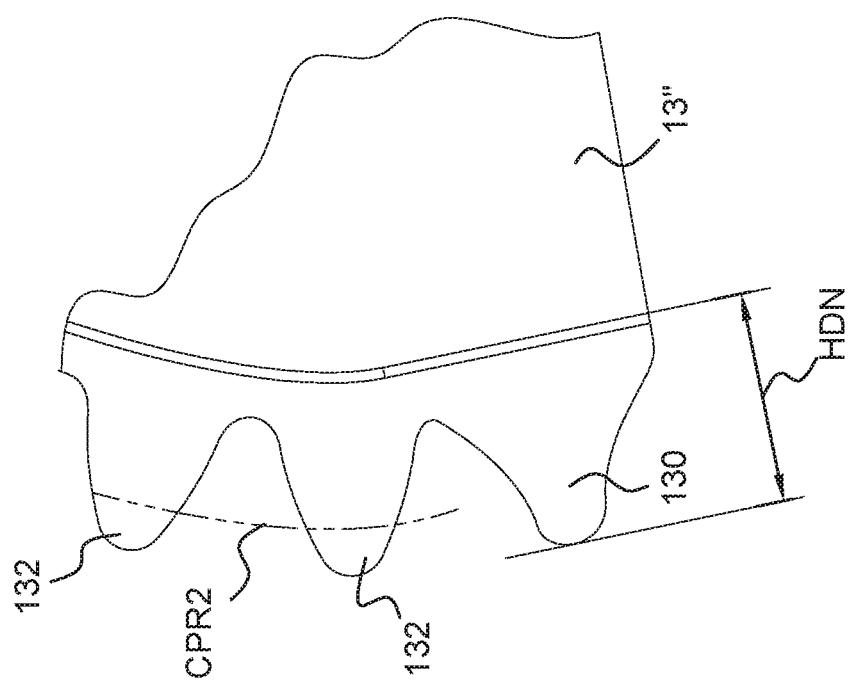
Figure 16C:
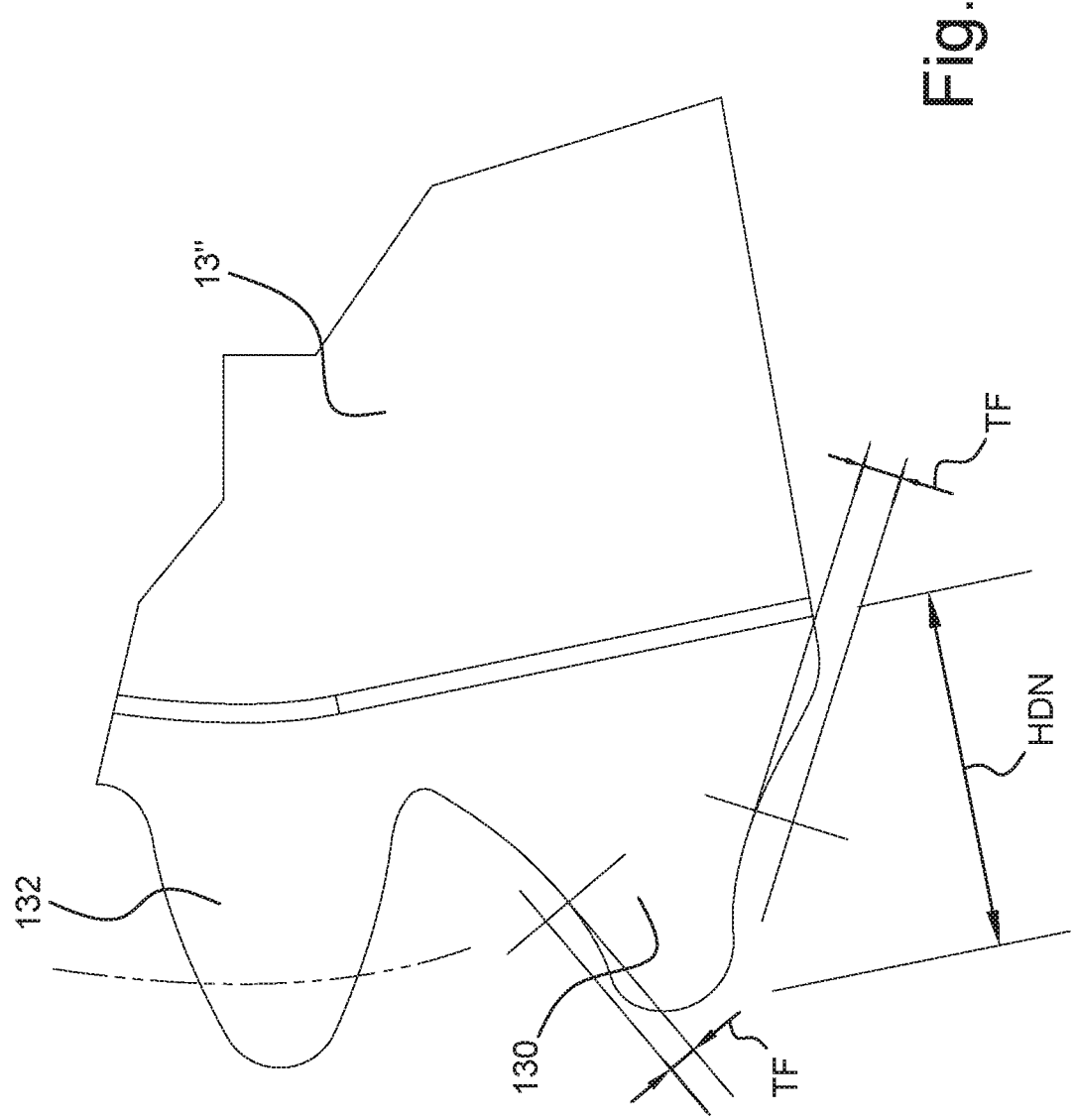

FIG. 5 a second top view of the door of FIG. 4, in which the door is open;

FIG. 6 shows the pitch profiles of the main drive of the motorized drive of FIG. 1;

FIG. 7 shows the toothed profiles of the gear with a variable transmission ratio of the main drive of the motorized drive of FIG. 1, in the position in which the door is completely closed, observing the toothed profiles according to a direction parallel to their rotation axes;

FIG. 8 shows the toothed profiles of FIG. 7, in a position in which the door is partially open;

FIG. 9 shows the toothed profiles of FIG. 7, in a position in which the door is completely open;

FIG. 10 shows a graph indicative of the reduction ratio of a kinematic mechanism with articulated arm of a known type, for operating wings of doors and main doors with an electric motor;

FIG. 11 shows a graph indicative of the reduction ratio of the reduction unit of FIGS. 6,7, 8, 9 or of FIGS. 12-18;

FIG. 12 shows a side view of a motorized drive according to a third particular embodiment of the invention;

FIG. 13 shows a top view of an open door and connected through an articulated arm to the motorized drive of FIG. 12;

FIG. 14 shows a first top view of a door connected through a sliding arm to the motorized drive of FIG. 13 according to a fourth particular embodiment of the invention, in which the door is closed;

FIG. 15 shows a second top view of the door of FIG. 14, in which the door is open;

FIG. 16 shows the toothed profiles of the gear with a variable transmission ratio of the main drive of the motorized drive of FIG. 12, in the position in which the door is completely closed or at the maximum of its closing, observing the toothed profiles according to a direction parallel to their rotation axes;

FIG. 16A shows a first enlarged view of FIG. 16, with a detail of the first stop tooth of the second toothed profile;

FIG. 16B shows a second enlarged view of FIG. 16, with a detail of the second stop tooth of the second toothed profile;

FIG. 16C shows an enlarged view of FIG. 16B, with a detail of the second stop tooth of the second toothed profile;

FIG. 17 shows the toothed profiles of FIG. 16, in a position in which the door is partially open;

FIG. 18 shows the toothed profiles of FIG. 16, in a position in which the door is completely open or at its maximum opening.

DETAILED DESCRIPTION

FIGS. 1-3, 6-9 are related to a barrier and to the relative drive according to a first particular embodiment, indicated with the overall reference 1.

As shown in FIG. 2-5, 13-15 said barrier 1, 1', 1", $1^{III}$ can be for example a door, such as a door inside a building or that separates the inside from the outside but, in other embodiments not shown, it can be for example a main door, a gate, porthole, a swing shutter for example of a garage, a sliding wall or partition or other sliding wing.

In the present description, a door, gate or main door refer to barriers comprising one or two wings which can be reversibly opened and closed by rotating each one around a relative rotation axis substantially vertical or in any case inclined less than 45° with respect to the vertical.

In the present description, swing shutter means a barrier comprising one or two wings which can be reversibly opened and closed by rotating each one around a relative rotation axis substantially horizontal or in any case inclined less than 45° with respect to a horizontal plane.

A porthole can be opened or closed by rotating around a horizontal, vertical axis or having any angle with respect to a horizontal plane.

Each barrier 1, 1', 1", $1^{III}$ comprises a wing 3 and a motorized drive 5, 5" configured to open and/or close the relative wing 3.

Like for example shown in FIGS. 2-5, 13-15 the wing 3 can reversibly close a space 2 delimited by a frame 4, which can for example be fixed to the wall of a building.

The motorized drive 5, 5" can for example be fixed to the frame 4 or directly to the wall of said building.

In other embodiments not shown the motorized drive 5,5" can for example be fixed to the wing 3.

According to an aspect of the invention, the motorized drive 5, 5" comprises:
 a motor 7;
 a reduction unit 9, 9" through which the motor 7 can operate the wing 3 by opening and closing it reversibly.

Like in the embodiment of FIG. 1, 12 the motor 7 can be electric.

The reduction unit 9; 9" comprises a first toothed profile 11; 11" and a second toothed profile 13; 13" which engage together between them forming a gear with variable transmission ratio depending on the angular and/or linear position of at least one of the two toothed profiles 11, 13; 11", 13".

At least one of the first 11; 11" and the second toothed profile 13; 13" forms at least one toothed section having a pitch profile CPR1, CPR2; CPR1", CPR2" substantially different from a full circumference, from a single arched circle and not even straight.

Like for example in the embodiments of the accompanying figures, the first 11; 11" and the second toothed profile 13, 13" can be toothings of cylindrical gears with straight teeth, but in other embodiments not shown they can also be toothings with helical and/or conical teeth.

The first 11; 11" and the second toothed profile 13; 13" are mounted on suitable shafts, not shown, and configured to rotate around respective axes AX11, AX13.

The two axes AX11, AX13 are preferably parallel to each other and arranged at a fixed distance from each other.

The distance between the respective rotation axes AX11, AX13 and a point of the pitch curve CPR11, CPR13 respectively of the toothing 11, 13; 11", 13" in question in the present description, the radius RP1, RP2 of the toothing associated with that point and the angular position $\alpha 11$, $\alpha 13$ of that point with respect to the respective axis AX11 or AX13 is considered.

Preferably the first toothed profile 11; 11" advantageously has a pitch profile as a whole closed on itself so as to allow the profile 11; 11" to describe full rotations rotating on itself when engaged with another toothed profile (FIGS. 1, 6, 7; 16-18).

Like in the embodiments of FIGS. 1, 6, 7; 16-18 the first toothed profile 11; 11" advantageously has a pitch profile whose shape is approximated by points from the following table 11A or 11B or 11C; the points are defined by the polar coordinates $\alpha 11$, RP1, where the angle $\alpha 11$ can be for example referred to the possible axis of symmetry AXS11 of the toothed profile 11, 11"; like for example in the embodiments of FIGS. 1, 6, 7, 16-18 the axis of symmetry AXS11 passes through the rotation axis AX11 and through the point where the radius RP1 is minimum

TABLE 11A

| Point | Angle α11 [degrees] | Radius RP1 Minimum values 2 [mm] | Radius RP1 Maximum values 2 [mm] | Radius RP1 Minimum values 1 | Radius RP1 Maximum values 1 [mm] |
|---|---|---|---|---|---|
| 1 | 0 | 13.94592 | 20.91888 | 12.20268 | 22.66212 |
| 3 | 20 | 14.62896 | 21.94344 | 12.80034 | 23.77206 |
| 5 | 40 | 16.08328 | 24.12492 | 14.07287 | 26.13533 |
| 7 | 60 | 17.62376 | 26.43564 | 15.42079 | 28.63861 |
| 9 | 80 | 18.87952 | 28.31928 | 16.51958 | 30.67922 |
| 11 | 100 | 19.71208 | 29.56812 | 17.24807 | 32.03213 |
| 13 | 120 | 20.12744 | 30.19116 | 17.61151 | 32.70709 |
| 15 | 140 | 20.73872 | 31.10808 | 18.14638 | 33.70042 |
| 17 | 160 | 20.23528 | 30.35292 | 17.70587 | 32.88233 |
| 19 | 180 | 20.23528 | 30.35292 | 17.70587 | 32.88233 |
| 21 | 200 | 20.23528 | 30.35292 | 17.70587 | 32.88233 |
| 23 | 220 | 20.73872 | 31.10808 | 18.14638 | 33.70042 |
| 25 | 240 | 20.12744 | 30.19116 | 17.61151 | 32.70709 |
| 27 | 260 | 19.71208 | 29.56812 | 17.24807 | 32.03213 |
| 29 | 280 | 18.87952 | 28.31928 | 16.51958 | 30.67922 |
| 31 | 300 | 17.62376 | 26.43564 | 15.42079 | 28.63861 |
| 33 | 320 | 16.08328 | 24.12492 | 14.07287 | 26.13533 |
| 35 | 340 | 14.62896 | 21.94344 | 12.80034 | 23.77206 |
| 37 | 360 | 13.94592 | 20.91888 | 12.20268 | 22.66212 |

TABLE 11B

| Point | Angle α11 [degrees] | Radius RP1 Values 5 [mm] | Radius RP1 Minimum values 4 | Radius RP1 Maximum values 4 [mm] | Radius RP1 Minimum values 3 | Radius RP1 Maximum values 3 [mm] |
|---|---|---|---|---|---|---|
| 1 | 0 | 17.4324 | 16.56078 | 18.30402 | 15.68916 | 19.17564 |
| 3 | 20 | 18.2862 | 17.37189 | 19.20051 | 16.45758 | 20.11482 |
| 5 | 40 | 20.1041 | 19.098895 | 21.109305 | 18.09369 | 22.11451 |
| 7 | 60 | 22.0297 | 20.928215 | 23.131185 | 19.82673 | 24.23267 |
| 9 | 80 | 23.5994 | 22.41943 | 24.77937 | 21.23946 | 25.95934 |
| 11 | 100 | 24.6401 | 23.408095 | 25.872105 | 22.17609 | 27.10411 |
| 13 | 120 | 25.1593 | 23.901335 | 26.417265 | 22.64337 | 27.67523 |
| 15 | 140 | 25.9234 | 24.62723 | 27.21957 | 23.33106 | 28.51574 |
| 17 | 160 | 25.2941 | 24.029395 | 26.558805 | 22.76469 | 27.82351 |
| 19 | 180 | 25.2941 | 24.029395 | 26.558805 | 22.76469 | 27.82351 |
| 21 | 200 | 25.2941 | 24.029395 | 26.558805 | 22.76469 | 27.82351 |
| 23 | 220 | 25.9234 | 24.62723 | 27.21957 | 23.33106 | 28.51574 |
| 25 | 240 | 25.1593 | 23.901335 | 26.417265 | 22.64337 | 27.67523 |
| 27 | 260 | 24.6401 | 23.408095 | 25.872105 | 22.17609 | 27.10411 |
| 29 | 280 | 23.5994 | 22.41943 | 24.77937 | 21.23946 | 25.95934 |
| 31 | 300 | 22.0297 | 20.928215 | 23.131185 | 19.82673 | 24.23267 |
| 33 | 320 | 20.1041 | 19.098895 | 21.109305 | 18.09369 | 22.11451 |

TABLE 11B-continued

| Point | Angle α11 [degrees] | Radius RP1 Values 5 [mm] | Radius RP1 Minimum values 4 | Radius RP1 Maximum values 4 [mm] | Radius RP1 Minimum values 3 | Radius RP1 Maximum values 3 [mm] |
|---|---|---|---|---|---|---|
| 35 | 340 | 18.2862 | 17.37189 | 19.20051 | 16.45758 | 20.11482 |
| 37 | 360 | 17.4324 | 16.56078 | 18.30402 | 15.68916 | 19.17564 |

TABLE 11C

| Point | Angle α11 [degrees] | Radius RP1 Minimum values 6 [mm] | Radius RP1 Maximum values 6 |
|---|---|---|---|
| 1 | 0 | 17.00 | 17.87 |
| 2 | 10 | 17.23 | 18.11 |
| 3 | 20 | 17.83 | 18.74 |
| 4 | 30 | 18.66 | 19.62 |
| 5 | 40 | 19.60 | 20.61 |
| 6 | 50 | 20.56 | 21.62 |
| 7 | 60 | 21.48 | 22.58 |
| 8 | 70 | 22.30 | 23.45 |
| 9 | 80 | 23.01 | 24.19 |
| 10 | 90 | 23.58 | 24.79 |
| 11 | 100 | 24.02 | 25.26 |
| 12 | 110 | 24.34 | 25.58 |
| 13 | 120 | 24.53 | 25.79 |
| 14 | 130 | 24.63 | 25.89 |
| 15 | 140 | 25.28 | 26.57 |
| 16 | 150 | 24.66 | 25.93 |
| 17 | 160 | 24.66 | 25.93 |
| 18 | 170 | 24.66 | 25.93 |
| 19 | 180 | 24.66 | 25.93 |
| 20 | 190 | 24.66 | 25.93 |
| 21 | 200 | 24.66 | 25.93 |
| 22 | 210 | 24.66 | 25.93 |
| 23 | 220 | 25.28 | 26.57 |
| 24 | 230 | 24.63 | 25.89 |
| 25 | 240 | 24.53 | 25.79 |
| 26 | 250 | 24.34 | 25.58 |
| 27 | 260 | 24.02 | 25.26 |
| 28 | 270 | 23.58 | 24.79 |
| 29 | 280 | 23.01 | 24.19 |
| 30 | 290 | 22.30 | 23.45 |
| 31 | 300 | 21.48 | 22.58 |
| 32 | 310 | 20.56 | 21.62 |
| 33 | 320 | 19.60 | 20.61 |
| 34 | 330 | 18.66 | 19.62 |
| 35 | 340 | 17.83 | 18.74 |
| 36 | 350 | 17.23 | 18.11 |
| 37 | 360 | 17.00 | 17.87 |

The pitch profiles CPR1, CPR2; CPR1", CPR2" are indicated in FIG. 7, 16 with dash-dotted lines.

The value of the radius RP1 at each point is preferably comprised between the respective minimum 1 and maximum value 1, more preferably comprised between the respective minimum 2 and maximum value 2, more preferably comprised between the respective minimum 3 and maximum value 3, more preferably comprised between the respective minimum 4 and maximum value 4; more preferably comprised between the respective minimum 6 and maximum value 6 and even more preferably about equal to the respective value 5 indicated in table 11A or 11B or 11C.

The dimensions of the pitch profile CPR1 of the first toothed profile 11, 11" can clearly vary by increasing or decreasing in scale the values of table 11A or 11B or 11C, but for example retaining its shape.

Preferably the radius RP1 has a single point of absolute minimum (at point 1, 37 of the embodiments of table 11A) along the pitch profile CPR1, CPR1".

Preferably the pitch profile CPR1, CPR1" is symmetrical with respect to an ideal plane passing through said point of absolute minimum and through the rotation axis AX11.

Preferably a portion of the pitch profile CPR1 around the point of absolute minimum is substantially straight and symmetrical with respect to the plane of symmetry of the profile CPR1, CPR1" and this substantially straight portion subtends an angle α11P comprised between about 50-75° with reference to the rotation axis AX11.

Preferably the portion of the pitch profile CPR1 diametrically opposite to the point of absolute minimum substantially forms an arc of a circle, it is also symmetrical with respect to the plane of symmetry of the profile CPR1 and subtends an angle α11C comprised between about 50-90° with reference to the rotation axis AX11.

Preferably the radius RP1 reaches two absolute maximum values on the entire pitch profile CPR1 arranged outside both the section in which this profile is substantially straight, and the section in which it is substantially an arc of a circle.

Preferably the second toothed profile 13, 13" forms at least a toothed section having a pitch profile substantially different from a full circumference, from a single arc of a circle and not even straight.

Preferably the second toothed profile 13, 13" forms at least a toothed section having a pitch profile as a whole substantially open, that is, not closed on itself (FIGS. 1, 6, 7, 16-18).

Like in the embodiment of FIGS. 1, 6, 7, 16-18 the second toothed profile 13; 13" advantageously has a pitch profile CPR2; CPR2" whose shape is approximated by points from the following table 13A or 13B or 13C; the points are defined by the polar coordinates α13, RP2, where the angle α13 can be for example referred to the possible axis of symmetry AXS13 of the toothed profile 13, 13"; like for example in the embodiment of FIGS. 1, 6, 7, 16-18 the axis of symmetry AXS13 passes through the rotation axis AX13 and through the point where the radius RP2 is minimum

TABLE 13A

| Point | Angle α13 [degrees] | Radius RP2 Minimum values 2 [mm] | Radius RP2 Maximum values 2 [mm] | Radius RP2 Minimum values 1 | Radius RP2 Maximum values 1 [mm] |
|---|---|---|---|---|---|
| 1 | −100 | 37.65408 | 56.48112 | 32.94732 | 61.18788 |
| 2 | −90 | 36.57824 | 54.86736 | 32.00596 | 59.43964 |
| 3 | −80 | 34.84488 | 52.26732 | 30.48927 | 56.62293 |
| 4 | −70 | 33.44368 | 50.16552 | 29.26322 | 54.34598 |
| 5 | −60 | 32.44296 | 48.66444 | 28.38759 | 52.71981 |
| 6 | −50 | 31.82656 | 47.73984 | 27.84824 | 51.71816 |
| 7 | −40 | 31.36472 | 47.04708 | 27.44413 | 50.96767 |
| 8 | −30 | 31.36472 | 47.04708 | 27.44413 | 50.96767 |
| 9 | −20 | 31.36472 | 47.04708 | 27.44413 | 50.96767 |
| 10 | −10 | 31.36472 | 47.04708 | 27.44413 | 50.96767 |
| 11 | 0 | 31.36472 | 47.04708 | 27.44413 | 50.96767 |
| 12 | 10 | 31.36472 | 47.04708 | 27.44413 | 50.96767 |
| 13 | 20 | 31.36472 | 47.04708 | 27.44413 | 50.96767 |
| 14 | 30 | 31.36472 | 47.04708 | 27.44413 | 50.96767 |
| 15 | 40 | 31.36472 | 47.04708 | 27.44413 | 50.96767 |
| 16 | 50 | 31.82656 | 47.73984 | 27.84824 | 51.71816 |
| 17 | 60 | 32.44296 | 48.66444 | 28.38759 | 52.71981 |
| 18 | 70 | 33.44368 | 50.16552 | 29.26322 | 54.34598 |
| 19 | 80 | 34.84488 | 52.26732 | 30.48927 | 56.62293 |
| 20 | 90 | 36.57824 | 54.86736 | 32.00596 | 59.43964 |
| 21 | 100 | 37.65408 | 56.48112 | 32.94732 | 61.18788 |

TABLE 13B

| Point | Angle α11 [degrees] | Radius RP1 Values 5 [mm] | Radius RP1 Minimum values 4 | Radius RP1 Maximum values 4 [mm] | Radius RP1 Minimum values 3 | Radius RP1 Maximum values 3 [mm] |
| --- | --- | --- | --- | --- | --- | --- |
| 1 | −100 | 47.0676 | 44.71422 | 49.42098 | 42.36084 | 51.77436 |
| 2 | −90 | 45.7228 | 43.43666 | 48.00894 | 41.15052 | 50.29508 |
| 3 | −80 | 43.5561 | 41.378295 | 45.733905 | 39.20049 | 47.91171 |
| 4 | −70 | 41.8046 | 39.71437 | 43.89483 | 37.62414 | 45.98506 |
| 5 | −60 | 40.5537 | 38.526015 | 42.581385 | 36.49833 | 44.60907 |
| 6 | −50 | 39.7832 | 37.79404 | 41.77236 | 35.80488 | 43.76152 |
| 7 | −40 | 39.2059 | 37.245605 | 41.166195 | 35.28531 | 43.12649 |
| 8 | −30 | 39.2059 | 37.245605 | 41.166195 | 35.28531 | 43.12649 |
| 9 | −20 | 39.2059 | 37.245605 | 41.166195 | 35.28531 | 43.12649 |
| 10 | −10 | 39.2059 | 37.245605 | 41.166195 | 35.28531 | 43.12649 |
| 11 | 0 | 39.2059 | 37.245605 | 41.166195 | 35.28531 | 43.12649 |
| 12 | 10 | 39.2059 | 37.245605 | 41.166195 | 35.28531 | 43.12649 |
| 13 | 20 | 39.2059 | 37.245605 | 41.166195 | 35.28531 | 43.12649 |
| 14 | 30 | 39.2059 | 37.245605 | 41.166195 | 35.28531 | 43.12649 |
| 15 | 40 | 39.2059 | 37.245605 | 41.166195 | 35.28531 | 43.12649 |
| 16 | 50 | 39.7832 | 37.79404 | 41.77236 | 35.80488 | 43.76152 |
| 17 | 60 | 40.5537 | 38.526015 | 42.581385 | 36.49833 | 44.60907 |
| 18 | 70 | 41.8046 | 39.71437 | 43.89483 | 37.62414 | 45.98506 |
| 19 | 80 | 43.5561 | 41.378295 | 45.733905 | 39.20049 | 47.91171 |
| 20 | 90 | 45.7228 | 43.43666 | 48.00894 | 41.15052 | 50.29508 |
| 21 | 100 | 47.0676 | 44.71422 | 49.42098 | 42.36084 | 51.77436 |

TABLE 13C

| Point | Angle α13 [degrees] | Radius RP2 Minimum values 6 [mm] | Radius RP2 Maximum values 6 [mm] |
| --- | --- | --- | --- |
| 1 | 0 | 45.89 | 48.24 |
| 2 | 10 | 44.58 | 46.87 |
| 3 | 20 | 42.47 | 44.65 |
| 4 | 30 | 40.76 | 42.85 |
| 5 | 40 | 39.54 | 41.57 |
| 6 | 50 | 38.79 | 40.78 |
| 7 | 60 | 38.23 | 40.19 |
| 8 | 70 | 38.23 | 40.19 |
| 9 | 80 | 38.23 | 40.19 |
| 10 | 90 | 38.23 | 40.19 |
| 11 | 100 | 38.23 | 40.19 |
| 12 | 110 | 38.23 | 40.19 |
| 13 | 120 | 38.23 | 40.19 |
| 14 | 130 | 38.23 | 40.19 |
| 15 | 140 | 38.23 | 40.19 |
| 16 | 150 | 38.79 | 40.78 |
| 17 | 160 | 39.54 | 41.57 |
| 18 | 170 | 40.76 | 42.85 |
| 19 | 180 | 42.47 | 44.65 |
| 20 | 190 | 44.58 | 46.87 |
| 21 | 200 | 45.89 | 48.24 |

The value of the radius RP2 at each point of the pitch curve CPR2, CPR2" is preferably comprised between the respective minimum 1 and maximum value 1, more preferably comprised between the respective minimum 2 and maximum value 2, more preferably comprised between the respective minimum 3 and maximum value 3, more preferably comprised between the respective minimum 4 and maximum value 4, more preferably comprised between the respective minimum 6 and maximum value 6 and even more preferably about equal to the respective value 5 indicated in table 13A or 13B or 13C.

The dimensions of the pitch profile CPR2; CPR2" of the second toothed profile 13, 13" can clearly vary by increasing or decreasing in scale the values of table 13A or 13B or 13C, but for example retaining its shape.

The pitch profiles defined by the Values 5 of tables 11A, 11B, 11C, 13A, 13B, 13C are shown in FIG. 6, engaged together between them.

Preferably the pitch profile CPR2; CPR2" is substantially symmetrical with respect to a plane passing through the axis of rotation AX13.

Preferably a portion of the pitch profile CPR2; CPR2" close to the plane of symmetry substantially has the shape of an arc of a circle, and subtends an angle α13C comprised between about 50-100° with reference to the axis of rotation AX13.

Preferably the second pitch profile CPR2; CPR2" overall subtends an angle α13 comprised between about 170°-240° with reference to the axis of rotation AX13, more preferably comprised between 190°-210° and even more preferably about equal to 200°.

In other embodiments not shown the first 11; 11" and the second toothed profile 13; 13" can have for example the shape of a full ellipse, a simple ellipse arc or also other forms.

Average radius $RP1\_m$ refers to the mean—preferably arithmetic, not weighted—on a round angle, or more generally on the angle subtended to the first toothed profile 11; 11" of the radius RP1.

Similarly, average radius $RP2\_m$ refers to the mean-preferably arithmetic, not weighted—on a round angle, or more generally on the angle subtended to the second toothed profile 13, 13" of the radius RP2.

Like in the embodiment of the accompanying figures, the first toothed profile 11, 11" forms the pinion of the gear, in the sense that its average radius $RP1\_m$ is equal to or less than the average radius $RP2\_m$ of the second toothed profile 13, 13".

Advantageously, while the pitch profiles of the first 11; 11" and of the second toothed profile 13; 13" rotate around the respective axes AX11, AX13, they are tangential to each other without mutual sliding; more particularly the second toothed profile 13; 13" is advantageously obtained by imposing the tangency without sliding on the pitch profile CPR1, CPR1" of the first toothed profile 11, 11".

Like in the embodiments of the accompanying figures, the second toothed profile 13, 13" can be interrupted at or near the points where the radius RP2 reaches its maximum.

Advantageously the first 11, 11" and the second toothed profile 13, 13" are such that their point of mutual contact PCN is at the maximum distance from the axis of rotation AX11 when it is at the minimum distance from the second axis AX13 or close thereto, like shown for example in FIG. 8, 16-18 or near said minimum distance.

Advantageously the first 11, 11" and the second toothed profile 13, 13" are such that their point of mutual contact PCN is at the minimum distance from the axis of rotation AX11 when it is at the maximum distance from the second axis AX13, like shown for example in FIG. 7, 9 16, 18 or near said maximum distance.

Advantageously the second toothed profile 13" is provided with a stop tooth 130 configured to prevent the first toothed profile 11, 11" from continuing its rotation on the second profile 13" when the two profiles are meshed together (FIG. 16-18, 16A, 16B).

For this purpose, each stop tooth 130 has at least one side whose shape is substantially complementary—i.e. it substantially forms its positive cast- to the shape of the spaces 110 of the teeth of the first toothed profile 11, 11", with shape tolerances sufficiently narrow so as to prevent the mutual rolling of the two toothed profiles meshed together (FIG. 16-18, 16A, 16B).

For this purpose at least part of the perimeter profile of each stop tooth 130 forms the positive cast of said spaces 110 with a shape tolerance TF preferably equal to or less than 0.5 millimetres in default with respect to the profile of the spaces 110, more preferably equal to or less than 0.1 millimetres, more preferably equal to or less than 0.05 millimetres, and even more preferably equal to or less than 0.025 millimetres (FIG. 16B, 16C).

The downward shape tolerance TF is measured in a direction perpendicular to the profile of the stop tooth 130 and/or of the corresponding space 110.

The downward shape tolerance TF at each point of the profile of the stop tooth 130 and/or of the corresponding space 110.

Aforesaid tolerance TF is preferably respected on a section of each stop tooth 130 which extends for at least 0.2 times the height HDN of said tooth 130, more preferably which extends for at least 0.3 times or 0.5 times or 0.7 times or 0.9 times the height HDN, and more preferably extends over the entire height HDN of the stop tooth 130 in question.

[62] Preferably the second toothed profile 13" is provided with two stop teeth 130 (FIG. 16).

The remaining teeth 132 of the second toothed profile, like for example also those of the first profile 11, 11", can have involute profiles or in any case be common gear teeth configured to allow another meshed toothing to roll over it.

The stop teeth 130 are useful for making mechanical limit stops which—possibly in combination with other mechanical, electromechanical or electronic limit stops—prevent the first toothed profile 11, 11" from making excessive rotations on the second profile 13" so as to disengage therefrom.

The two stop teeth 130 can be found, for example, near or at the ends of the arch formed as a whole by the second pitch profile CPR2" (FIG. 16, 16A, 16B).

Preferably the transmission ratio ρ [rho] of the transmission unit 9 varies from 0.1-4 times, between 0.15-1.61 times, between 0.1-3 times, between 0.19-1.29 times, between 0.25-2.5 times, between 0.25-0.97 times, between times or between 0.37-0.65 times, considering in said intervals both the minimum and maximum values that the transmission ratio ρ [rho] reaches during the operation of a same transmission unit 9, 9".

The ratio between the maximum ρ_max and the minimum ρ_min value that the transmission ratio ρ [rho] of the transmission unit 9, 9" reaches during its operation is preferably comprised between 0.1-4 times, between 0.70-4.35 times, between 0.1-3 times, between 0.87-3.48 times, between 0.25-2.5 times, between 1.16-2.61 times, and for example about equal to 3 times or to 1.74 times.

FIG. 11 shows indicatively a possible trend of the reduction ratio (i.e. the inverse of the transmission ratio) of the reduction unit 9.

Advantageously, the trend of the reduction ratio shown in FIG. 11 gives a greater initial reduction (in the first phase of the motion of the wing 3), a lower central reduction (in the central phase of the motion of the wing 3) and a greater final reduction (in the third phase of the motion of the wing 3).

Said trend of the reduction ratio makes the torque required from the motor to move the wing 3 to be very uniform during the duration of the motion.

Figure 2:
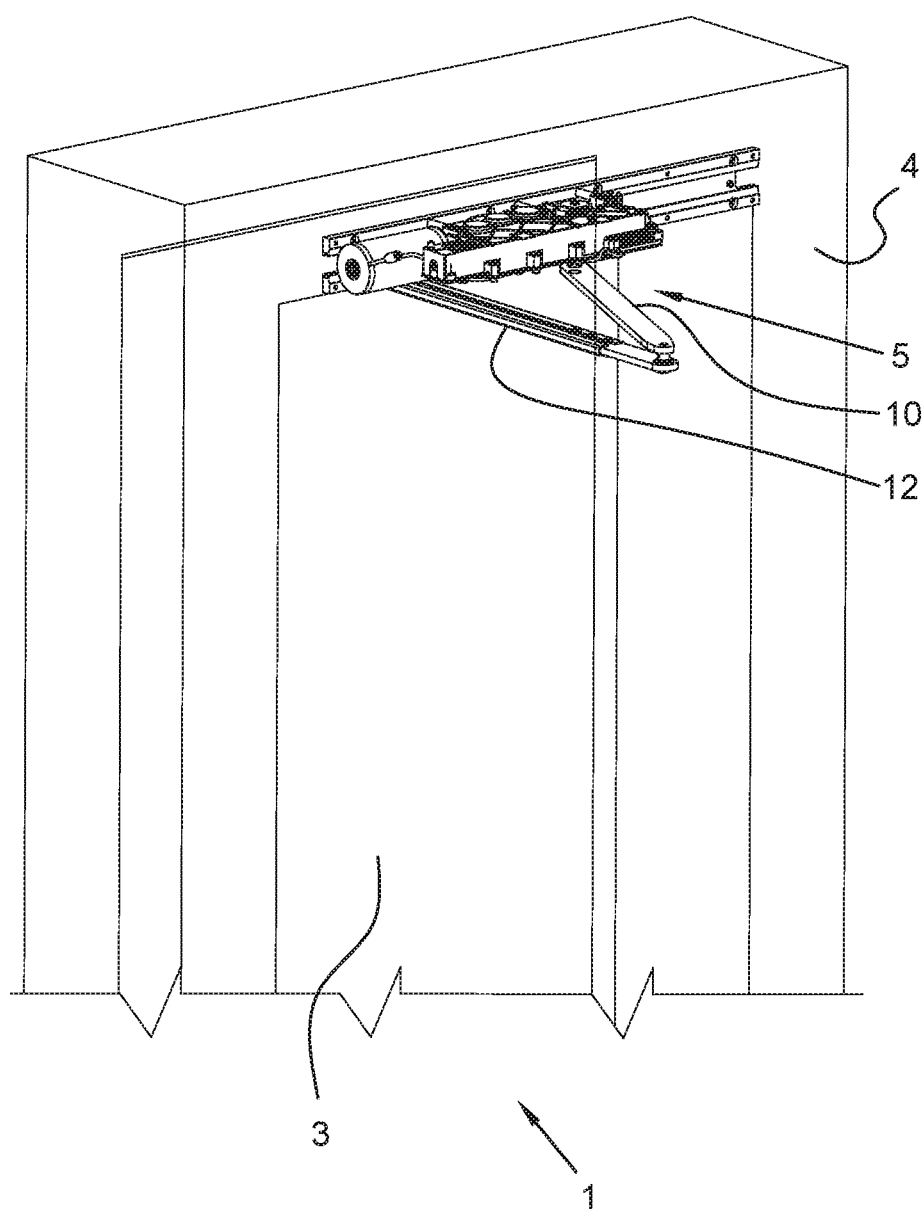
FIG. 2 shows a perspective view of a door connected by an articulated arm to the motorized drive of FIG. 1, in which the door is closed.
Figure 3:
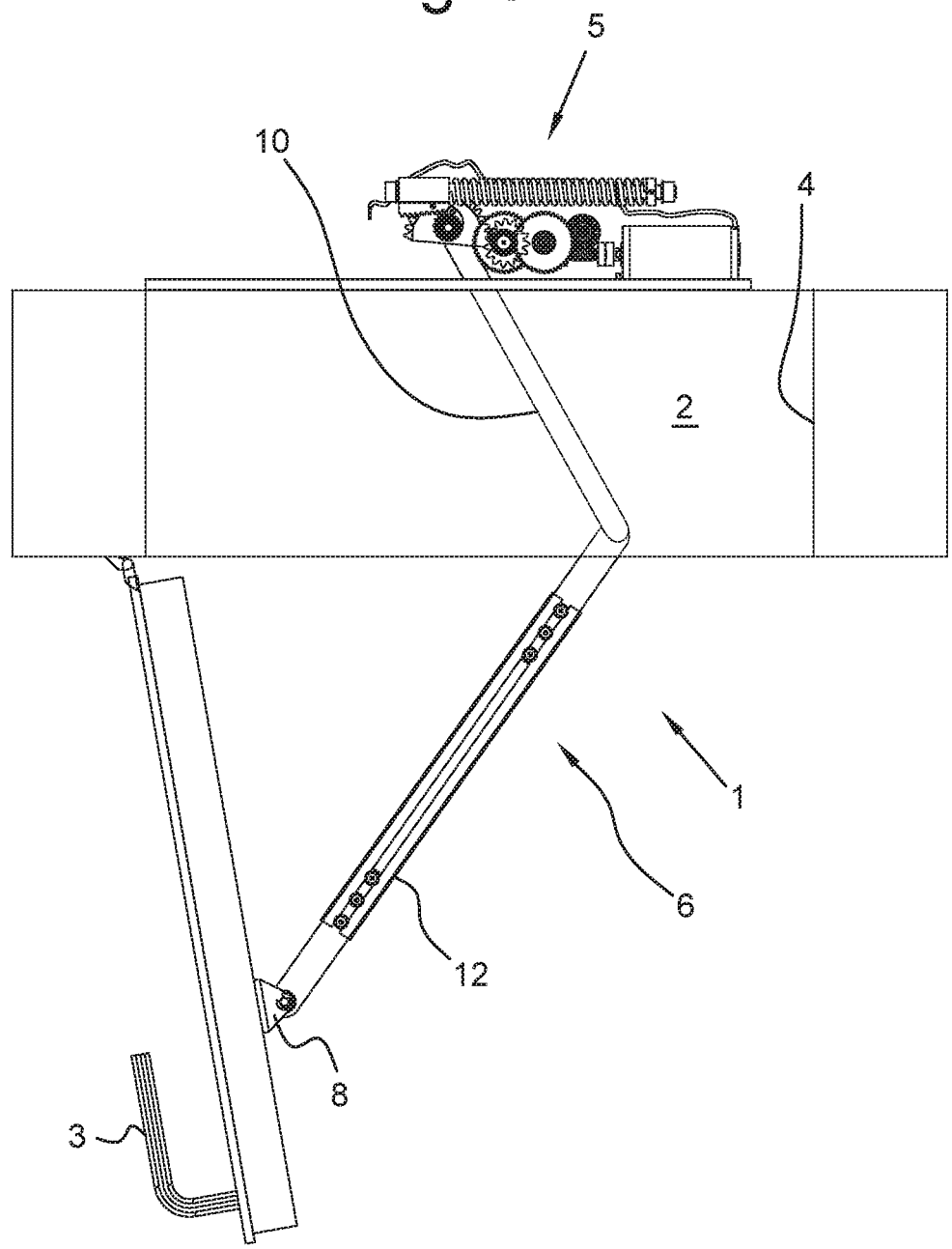
FIG. 3 shows a top view of the open door of FIG. 2.

Like for example in the embodiment of FIGS. 2, 3 the motorized drive 5; 5" can further comprise an actuating kinematic mechanism comprising in turn an articulated arm 6.

The articulated arm 6 can be fixed to the wing 3 and to the rest of the drive 5 without being able to slide with respect to the wing and the rest of the drive 5; for example it can be fixed to a bracket 8 integrally fixed to the wing 3 without being able to slide with respect thereto.

The articulated arm 6 can comprise for example two levers 10, 12 connected together by a hinge or other articulation.

In other embodiments not shown the articulated arm 6 can comprise a greater number of levers or more complex lever systems.

Like for example in the embodiment of FIGS. 4, 5; 14, 15 the motorized drive 5; 5''' can further comprise an actuating kinematic mechanism comprising in turn a sliding guide 12' and an arm 10' sliding in said guide 12'.

The arm 10' can for example comprise a shoe or other slider engaged with the guide 12' so that it can slide along it.

Thanks to the greater uniformity of the resistant loads they offer, gears comprising at least one toothed wheel whose pitch profile is substantially different from a full circumference, from a simple arc of circle and it is not even straight can be advantageously applied not only to electric motors but also for example to spring motors or more generally to elastic energy motors.

Said spring or elastic energy motor can be used as a mechanical energy accumulator to be used as an auxiliary motor in case of emergency, for example to partially or completely close a wing 3 in the event of fault or lack of power supply of the main motor—for example electric—7 of the motorized drive 5, for example in the event of an electrical fault or in any case interruption of the power supply line of the motor 7.

The motorized drive 5 preferably comprises a casing 25 to which one or more of the toothed wheels or cams 11, 11", 13, 13", 15, 17, 21, 23, the motor 7 are fixed and in which they are possibly contained.

The casing 25 may optionally form a box or other shell which encloses one or more of the toothed wheels or cams 11, 11", 13, 13", 15, 17, 21, 23, the motor 7.

An example of operation and use of the barrier 1, 1', 1", 1''' and the relative drive 5, 5" described above is now described.

Assuming that the wing 3 is initially closed, and therefore substantially coplanar to the surface of the wall 2, in this condition the two toothed profiles 11, 13; 11", 13" are in the condition of FIG. 7;16 with their contact point PCN at minimum distance from the axis of rotation AX11 and maximum distance from the axis of rotation AX13, so as to minimize the transmission ratio ρ [rho]=RP1/RP2 of the transmission unit 9, 9".

In the condition of FIG. 16, 16B, the stop tooth 130 of the second toothed profile 13" is jammed in a space between two adjacent teeth of the toothed profile 11", that is, it is in an end-of-stroke position.

With reference to FIGS. 7, 16 to open the wing 3 the electric motor 7 rotates for example the first toothed profile 11 counterclockwise, and the second toothed profile 13 clockwise.

As the two toothed profiles rotate, the distance of their contact point PCN from the axis AX11 increases while the distance of the same point from the axis AX13 progressively decreases, consequently increasing the transmission ratio ρ [rho]=RP1/RP2 of the transmission unit 9, 9".

This means that the motorized drive 5, 5" starts to open the relative wing 3 with a minimum transmission ratio ρ [rho], the pinion 11, 11" applies an initially maximum driving and then progressively decreasing torque to the driven toothing 13, 13", rotating the toothing 13, 13" at an initially minimum and progressively increasing speed.

In the condition of FIG. 8; 17 the distance of the contact point PCN of the profiles 11, 13; 11", 13" from the axis AX11 substantially reaches its maximum value, while the distance of the point PCN from the axis AX13 reaches its minimum value, causing the transmission ratio ρ [rho] to reach its maximum value.

The condition of FIG. 8; 17 is particularly suitable for the intermediate phase between the acceleration and deceleration phases of the rotation of the wing, whether it is opening or closing: the wing does not require further acceleration, on the contrary it is about to be braked and therefore it requires only a minimum driving torque from the motor 7, for example just sufficient to overcome the internal frictions at the hinges of the wing and in general the frictions that oppose the movement of the wing 3.

In this phase it is sufficient that the motor 7 rotates the wing 3 at the maximum possible speed by applying low driving torques and imparting on it almost zero or very low accelerations, since the wing 3 is now launched and can continue its motion even only thanks to its inertia.

Once the phase of FIG. 8; 17 has been overcome, the wing 3 must be decelerated because it is approaching the end of its stroke, that is, for example, to the fully open position.

It is therefore useful that the motor 7 applies a progressively increasing braking torque to the wing 3, at the same time slowing down its rotation, and precisely for this purpose after the condition of FIG. 8; 17 the distance of the contact point PCN of the profiles 11, 13; 11", 13" from the axis AX11 decreases again, while the distance of the point PCN from the axis AX13 increases again, progressively and reducing again the transmission ratio ρ [rho].

In the subsequent condition of FIG. 9,18 corresponding for example to a condition of full opening of the wing 3, the distance of the contact point PCN of the profiles 11, 13; 11", 13" from the axis AX11 has reached a second minimum value, while the distance of the point PCN from the axis AX13 has reached its maximum value again, making the transmission ratio ρ [rho] reach its minimum value again.

This means that switching from the condition of FIG. 8; 17 to that of FIG. 9; 18 the pinion 11, 11" is able to energetically brake the wing 3 with a progressively increasing torque, imposing a progressively decreasing speed on it.

In the condition of FIG. 9; 18 the motor can for example stop the rotation of the toothed profiles 11, 13; 11", 13" by correspondingly stopping the wing 3 for example in a fully open position.

In the condition of FIG. 18, similarly to the condition of FIG. 16B the stop tooth 130 is jammed or in any case blocked in the space of the toothed profile 11" preventing the latter from rolling further on the first toothed profile 13"; in other words, the tooth 130 is in a second end-of-stroke position.

The reduction unit 9, 9" and more generally the gear comprising the toothed profiles 11, 13; 11", 13" are therefore able to achieve a lower transmission ratio ρ [rho]=RP1/RP2 in the initial acceleration and final deceleration phases of the wing 3, and a greater transmission ratio ρ [rho] in the central phase of the motion of the wing, making the resistant torque applied to the motor 7 more uniform with respect to a transmission unit provided exclusively with gears with circular toothed profiles and without a gearbox.

More generally, from the preceding description it is clear that the transmission unit 9, 9" with variable transmission ratio, having an extremely simple mechanical construction, is able to make the resistant torque applied to the motor of a drive of a movable barrier much more uniform such as for example the rotating wing of a door, main door, swing gate or shutter, or even the sliding wing of a wall or sliding partition.

Having to overcome a more uniform resistant torque, the motor 7 can have a smaller size; for example, the authors of the present invention have succeeded in reducing the size and rating power of the electric motors 7 by about half, for the same opening time of the wing 3.

For the same installed electrical power of the motor 7, the maximum rotation speed can be considerably reduced, for example halved, thereby reducing the vibrations and noise of speed of the reduction unit.

By operating more often in conditions closer to optimal conditions, said motor can operate with greater efficiency, and consequently less heating and stress in the case of an electric motor 7.

For the same reasons, the entire motorized drive 5, 5" can be sized more lightweight and less massively than if it had a fixed transmission ratio.

In particular with an actuator 5,5" with the same installed electrical power, the speed and consequently also the time, for opening and closing the wing 3 according to the weight of the latter can be adjusted in a wider range—for example double—with respect to a transmission with front gears with constant transmission ratio.

The resistant torque applied to the motor of a drive of a movable barrier of aforesaid type can be made even more uniform by the possible articulated arm 6.

FIG. 10 shows indicatively a possible trend of the reduction ratio (that is the inverse of the transmission ratio) of a single articulated arm 6 formed by two levers hinged depending on the opening angle of the wing of a door, such as for example the wing 3 of FIG. 2.

The transmission ratio of the arm 6 contributes to making the overall transmission ratio of the motorized drive 5; 5" more similar to the desired speed profile, with an initial section of acceleration of the wing, an intermediate section at almost constant speed of the wing and a final section of deceleration of the wing, which corresponds to applying to the electric motor 7 a very constant resistant torque as the opening angle of the wing 3 changes.

On the other hand, a kinematic mechanism with a shoe-like arm has an almost uniform transmission ratio depending on the opening angle of the wing.

To obtain the desired speed profile, the motor is forced to impose high torques in acceleration and deceleration.

Due to the uniform transmission ratio of the kinematic mechanism with shoe-like arm, a manufacturer is often obliged to declare lower values of maximum inertia of the wing with respect to a kinematic mechanism with articulated arm.

Advantageously, with the introduction of the variable transmission ratio of the reduction unit 9, 9", on the other hand, it is possible to guarantee the desired speed profile also by using a kinematic mechanism with shoe-like arm by applying a constant resistant torque to the motor.

Furthermore, the reduction unit 9; 9" allows to declare a single value of maximum inertia of a wing that can be operated with a motorized drive, regardless of whether the drive comprises a kinematic mechanism with articulated arm or it is shoe-like.

The toothed gears 11, 13; 11", 13" previously described are capable of reproducing a wide range of movements of a wing, in particular reproducing a wide range of speed profiles, providing high torques and low actuation speeds when high accelerations or decelerations are desired, for example at the beginning and at the end of a closing or opening movement of a rotating or sliding wing 3, and weak torques and high speeds for example in the central phase of opening or closing a rotating or sliding wing or in any case in phases of the movement in which an almost constant speed of the wing is desired.

The motorized barrier 1, 1', 1", 1$^{III}$ advantageously comprises a logic control unit, comprising for example one or more electronic microprocessors, and one or more remote control device through which a user can remotely control the opening or closing of the wing or wings 3 by sending appropriate command signals to the logic control unit.

Said command signals can be sent for example by radio or acoustic waves, or again be for example optical signals.

The embodiments described above are susceptible to numerous modifications and variants, without departing from the scope of the present invention.

Every reference in this description to "an embodiment", "an embodiment example" means that a particular feature or structure described in relation to such embodiment is included in at least one embodiment of the invention and in particular in a specific variant of the invention as defined in a main claim.

The fact that such expressions appear in various passages of the description does not imply that they are necessarily referred solely to the same embodiment.

In addition, when a feature, element or structure is described in relation to a particular embodiment, it is observed that it is within the competence of the person skilled in the art to apply such feature, element or structure to other embodiments.

Numerical references that differ only in the different superscripts, e.g. 21', 21", 21$^{III}$ when not otherwise specified indicate different variants of an element called in the same way.

Furthermore, all of the details can be replaced by technically equivalent elements.

For example, the materials used, as well as the dimensions thereof, can be of any type according to the technical requirements.

It must be understood that an expression of the type "A comprises B, C, D" or "A is formed by B, C, D" also comprises and describes the particular case in which "A is made up of B, C, D".

The expression "A comprises an element B" unless otherwise specified is to be understood as "A comprises one or more elements B".

References to a second, third, fourth entity and so on do not necessarily imply the existence of a first, second and third entity respectively but they are simply a conventional name to indicate that an nth entity might be different and distinct from any other 1, 2th ... (n−1), (n+1)-th entities, if they existed.

The examples and lists of possible variants of the present application are to be construed as non-exhaustive lists.

Barzanò & Zanardo Milano S.p.A.

What is claimed is:

1. Motorized drive configured to open and/or close a wing of a barrier wherein the motorized drive comprises an electric motor and a reduction unit through which the electric motor can operate the wing opening and closing and wherein:
   the reduction unit comprises a first and a second toothed profile engaging together, thus forming a gear with a variable transmission ratio depending on the angular and/or linear position of at least one of the two toothed profiles; and
   at least one of the first and of the second toothed profile forms at least one toothed section having a pitch profile which is substantially non-circular;
   wherein the first toothed profile comprises teeth along an entire circumference thereof and is configured to fully rotate around a first rotation axis that is located within the first toothed profile and has a pitch profile comprising a shape defined by points, each point being at a distance from said first rotation axis and determined based on the Minimum Values_3 and the Maximum Values_3 indicated in Table 11B, the Minimum Values_3 and the Maximum Values_3 being unitless and uniformly scalable, wherein said distance and said pitch profiles are considered in a plane perpendicular to the first rotation axis, wherein the second toothed profile has a substantially arched shape delimited by a first and a second end and is configured to rotate around a second rotation axis, when the first and the second toothed profile are engaged at or near the first and/or the second end of the second toothed profile the mutual contact point between the first and the second toothed profile is at a minimum distance from the first axis of rotation or is close to this minimum distance.

2. The motorized drive according to claim 1, wherein the second toothed profile is configured to rotate around a second rotation axis that is located within the second toothed profile and has a pitch profile comprising a shape defined by points, each point being at a distance from said second rotation axis and determined based on the Minimum Values_1 and the Maximum Values_1 indicated in Table 13A, the Minimum Values_1 and the Maximum Values_1 being unitless and uniformly scalable, wherein said distance and said pitch profiles are considered in a plane perpendicular to the second axis of rotation.

3. The motorized drive according to claim 2, wherein the second toothed profile has a pitch profile comprising a shape defined by points, each point being at a distance from said second rotation axis and determined based on Minimum Values_2 and the Maximum Values_2 indicated in Table 13A, the Minimum Values_2 and the Maximum Values_2 being unitless and uniformly scalable.

4. The motorized drive according to claim 2, wherein the second toothed profile has a pitch profile comprising a shape defined by points, each point being at a distance from said second rotation axis and determined based on the Minimum Values_3 and the Maximum Values_3 indicated in Table 13B, the Minimum Values_3 and the Maximum Values_3 being unitless and uniformly scalable.

5. The motorized drive according to claim 1, wherein both the first and the second toothed profile form at least one toothed section having a pitch profile which is substantially non-circular and is neither exclusively an arched circle nor straight.

6. The motorized drive according to claim 1, wherein the second toothed profile comprises a section whose pitch profile has been obtained by imposing the tangency without sliding on the pitch profile of the first toothed profile.

7. The motorized drive according to claim 1, wherein the motorized drive is configured to make the wing perform an opening or closing stroke comprising:
   an initial phase in which the reduction unit transfers the motion to the wing with a reduction ratio;
   an intermediate phase in which the reduction unit transfers the motion to the wing with a lower reduction ratio than in the initial phase;
   a final phase in which the reduction unit transfers the motion to the wing with a greater reduction ratio than in the intermediate phase.

8. The motorized drive according to claim 1, where the second toothed profile comprises at least one stop tooth configured to prevent the first toothed profile from continuing to rotate on the second toothed profile when the two toothed profiles are meshed together.

9. Motorized drive configured to open and/or close a wing of a barrier wherein the motorized drive comprises an electric motor and a reduction unit through which the electric motor can operate the wing opening and closing and wherein:
- the reduction unit comprises a first and a second toothed profile engaging together, thus forming a gear with a variable transmission ratio depending on the angular and/or linear position of at least one of the two toothed profiles; and
- at least one of the first and of the second toothed profile forms at least one toothed section having a pitch profile which is substantially non-circular;
- wherein the first toothed profile comprises teeth along an entire circumference thereof and is configured to fully rotate around a first rotation axis that is located within the first toothed profile and has a pitch profile comprising a shape defined by points, each point being at a distance from said first rotation axis and determined based on the Minimum Values_3 and the Maximum Values_3 indicated in Table 11B, the Minimum Values_3 and the Maximum Values_3 being unitless and uniformly scalable, wherein said distance and said pitch profiles are considered in a plane perpendicular to the first rotation axis, wherein the second toothed profile has a substantially arched shape delimited by a first and a second end and is configured to rotate around a second rotation axis that is located within the second toothed profile when the first and the second toothed profile are engaged at or near a substantially middle portion between the two ends of the second toothed profile, the contact point between the first and second toothed profile is at a maximum distance from the first rotation axis.

10. The motorized drive according to claim 9, wherein the second toothed profile is configured to rotate around a second rotation axis that is located within the second toothed profile and has a pitch profile comprising a shape defined by points, each point being at a distance from said second rotation axis and determined based on the Minimum Values_1 and the Maximum Values_1 indicated in Table 13A, the Minimum Values_1 and the Maximum Values_1 being unitless and uniformly scalable, wherein said distance and said pitch profiles are considered in a plane perpendicular to the second axis of rotation.

11. The motorized drive according to claim 10, wherein the second toothed profile has a pitch profile comprising a shape defined by points, each point being at a distance from said second rotation axis and determined based on the Minimum Values_2 and the Maximum Values_2 indicated in Table 13A, the Minimum Values_2 and the Maximum Values_2 being unitless and uniformly scalable.

12. The motorized drive according to claim 10, wherein the second toothed profile has a pitch profile comprising a shape defined by points, each point being at a distance from said second rotation axis and determined based on the Minimum Values_3 and the Maximum Values_3 indicated in Table 13B, the Minimum Values_3 and the Maximum Values_3 being unitless and uniformly scalable.

13. The motorized drive according to claim 9, wherein both the first and the second toothed profile form at least one toothed section having a pitch profile which is substantially non-circular and is neither exclusively an arched circle nor straight.

14. The motorized drive according to claim 9, wherein the second toothed profile comprises a section whose pitch profile has been obtained by imposing the tangency without sliding on the pitch profile of the first toothed profile.

15. The motorized drive according to claim 9, wherein the motorized drive is configured to make the wing perform an opening or closing stroke comprising:
- an initial phase in which the reduction unit transfers the motion to the wing with a reduction ratio;
- an intermediate phase in which the reduction unit transfers the motion to the wing with a lower reduction ratio than in the initial phase;
- a final phase in which the reduction unit transfers the motion to the wing with a greater reduction ratio than in the intermediate phase.

16. The motorized drive according to claim 9, where the second toothed profile comprises at least one stop tooth configured to prevent the first toothed profile from continuing to rotate on the second toothed profile when the two toothed profiles are meshed together.

* * * * *